United States Patent
Nakawaki

(10) Patent No.: US 8,310,711 B2
(45) Date of Patent: Nov. 13, 2012

(54) OUTPUT DEVICE AND ITS CONTROL METHOD FOR MANAGING AND REUSING A JOB HISTORY

(75) Inventor: Jun Nakawaki, Yokohama (JP)

(73) Assignee: Canon Kabushiki Kaisha (JP)

( * ) Notice: Subject to any disclaimer, the term of this patent is extended or adjusted under 35 U.S.C. 154(b) by 745 days.

(21) Appl. No.: 12/418,978

(22) Filed: Apr. 6, 2009

(65) Prior Publication Data

US 2009/0251729 A1 Oct. 8, 2009

(30) Foreign Application Priority Data

Apr. 8, 2008 (JP) ................................. 2008-100866

(51) Int. Cl.
*G06F 15/00* (2006.01)
*G06K 1/00* (2006.01)
*G06K 15/00* (2006.01)

(52) U.S. Cl. ........................ 358/1.16; 358/1.14

(58) Field of Classification Search .................... 358/1.1, 358/1.16, 1.13, 1.14
See application file for complete search history.

(56) References Cited

U.S. PATENT DOCUMENTS 6,681,344 B1 * 1/2004 Andrew ...................... 714/38.14
7,856,657 B2 * 12/2010 Moore et al. ...................... 726/5

FOREIGN PATENT DOCUMENTS

| JP | 2003-140854 A | 5/2003 |
| JP | 2006-140946 A | 6/2006 |
| JP | 2006-220940 A | 8/2006 |
| JP | 2006-279545 A | 10/2006 |
| JP | 2008-017394 A | 1/2008 |
| JP | 2008-023890 A | 2/2008 |

OTHER PUBLICATIONS

JP Office Action issued Jul. 13, 2012 for corresponding JP2008-100866.

* cited by examiner

*Primary Examiner* — Douglas Tran
(74) *Attorney, Agent, or Firm* — Rossi Kimms & McDowell LLP

(57) ABSTRACT

When a user logs in to an MFP (S200), places an original on a scanner, and instructs the MFP to start a process, the MFP scans the original to recognize characters and words, and creates a word appearance frequency list (S201). Thereafter, records (histories) contained in information about histories of jobs that were executed in the past are narrowed into histories that were executed by users having the same attribute as that of the login user (S202). Functions of jobs contained in identified histories are compared, and job histories having similar functions are grouped. Finally, functions and settings of remaining histories are displayed on a user interface (S204). When any of them is selected, a document is processed according to the selected function and setting (S205). Thereafter, a history of the job is stored (S206).

13 Claims, 26 Drawing Sheets

FIG. 10

| USER NAME | DEPARTMENT | POSITION | PROJECT | CHARGE | e-mail |
|---|---|---|---|---|---|
| A | DS52 | GENERAL | DMS | BOX COORDINATION | A@kanon.co.jp |
| B | DS52 | MANAGEMENT | DMS | ALL | B@kanon.co.jp |
| C | DS51 | GENERAL | JA | MEAP APPLICATION | C@kanon.co.jp |

1001

F I G. 11

| HISTORY ID | iR | DATE OF EXECUTION | FUNCTION | DETAILED SETTING | USER PROPERTY | PURPOSE |
|---|---|---|---|---|---|---|
| 1 | 001 | 2007/4/10 16:18 | Send | ¥¥DMS¥MINUTES¥20070410 MINUTES.pdf 300dpi | A | SHARE WITH DMS DEVELOPER |
| 2 | 001 | 2007/4/15 10:00 | Send | ¥¥DMS¥MINUTES¥20070415 MINUTES.pdf 300dpi | A | SHARE WITH DMS DEVELOPER |
| 3 | 002 | 2007/5/1 12:00 | Send | ¥¥JA¥DISTRIBUTED_DOCUMENT ABOUT_JA.pdf 300dpi | C | SHARE WITH JA PARTY CONCERNED |
| 4 | 001 | 2007/5/10 12:00 | e-mail | A@kanon.co.jp | A | SEND TO HIMSELF OR HERSELF |
| 5 | 001 | 2007/5/12 18:00 | e-mail | B@kanon.co.jp | B | SEND TO HIMSELF OR HERSELF |
| 6 | 001 | 2007/5/20 20:00 | Send | ¥¥DMS¥SCHEDULE DMS_SCHEDULE.pdf 300dpi | B | SHARE WITH DMS DEVELOPER |
| 7 | 002 | 2007/5/21 9:00 | RemoteBox | iR : 001 BoxNo.20 IDEA_SHEET.pdf | B | IP ACTIVITY |
| 8 | 001 | 2007/5/30 12:00 | ScanToBox | iR : 001 BoxNo.10 REVIEW_MEMO.pdf | A | SHARE WITH DMS SALESPERSON |

| HISTORY ID | WORD | NUMBER OF TIMES |
|---|---|---|
| 1 | DMS | 5 |
|   | SCHEDULE | 3 |
|   | MINUTES | 1 |
| 2 | DMS | 7 |
|   | SCHEDULE | 2 |
|   | MINUTES | 1 |
| 3 | JA | 4 |
|   | DEVICE | 3 |
|   | REVIEW | 2 |
| 4 | PATENT | 4 |
|   | IDEA | 2 |
|   | MATERIAL | 1 |
| 5 | TRAINING | 3 |
|   | DEVELOPMENT SECTION | 1 |
|   | DMS | 1 |
| 6 | DMS | 5 |
|   | SCHEDULE | 3 |
|   | DEVELOPMENT | 2 |
| 7 | PATENT | 4 |
|   | IDEA | 2 |
|   | MATERIAL | 1 |
| 8 | SPECIFICATION | 3 |
|   | DMS | 3 |
|   | REVIEW | 2 |

FIG. 13A

| HISTORY ID | iR | DATE OF EXECUTION | FUNCTION | DETAILED SETTING | USER PROPERTY | PURPOSE | HISTORY ID | WORD | NUMBER OF TIMES |
|---|---|---|---|---|---|---|---|---|---|
| 1 | 001 | 2007/4/10 16:18 | Send | ✱✱DMS✱MINUTES✱20070410 MINUTES.pdf 300dpi | A | SHARE WITH DMS DEVELOPER | 1 | DMS | 5 |
| | | | | | | | | SCHEDULE | 3 |
| | | | | | | | | MINUTES | 1 |
| 2 | 001 | 2007/4/15 10:00 | Send | ✱✱DMS✱MINUTES✱20070415 MINUTES.pdf 300dpi | A | SHARE WITH DMS DEVELOPER | 2 | DMS | 7 |
| | | | | | | | | SCHEDULE | 2 |
| | | | | | | | | MINUTES | 1 |
| 3 | 002 | 2007/5/1 12:00 | Send | ✱✱JA✱DISTRIBUTED_DOCUMENT ABOUT_JA.pdf 300dpi | C | SHARE WITH JA PARTY CONCERNED | 3 | JA | 4 |
| | | | | | | | | DEVICE | 3 |
| | | | | | | | | REVIEW | 2 |
| 4 | 001 | 2007/5/10 12:00 | e-mail | A@kanon.co.jp | A | SEND TO HIMSELF OR HERSELF | 4 | PATENT | 4 |
| | | | | | | | | IDEA | 2 |
| | | | | | | | | MATERIAL | 1 |
| 5 | 001 | 2007/5/12 18:00 | e-mail | B@kanon.co.jp | B | SEND TO HIMSELF OR HERSELF | 5 | TRAINING | 3 |
| | | | | | | | | DEVELOPMENT SECTION | 1 |
| | | | | | | | | DMS | 1 |
| 6 | 001 | 2007/5/20 20:00 | Send | ✱✱DMS✱SCHEDULE DMS_SCHEDULE.pdf 300dpi | B | SHARE WITH DMS DEVELOPER | 6 | DMS | 5 |
| | | | | | | | | SCHEDULE | 3 |
| | | | | | | | | DEVELOPMENT | 2 |
| 7 | 002 | 2007/5/21 9:00 | RemoteBox | iR : 001 BoxNo.20 IDEA_SHEET.pdf | B | IP ACTIVITY | 7 | PATENT | 4 |
| | | | | | | | | IDEA | 2 |
| | | | | | | | | MATERIAL | 1 |
| 8 | 001 | 2007/5/30 12:00 | ScanToBox | iR : 001 BoxNo.10 REVIEW_MEMO.pdf | A | SHARE WITH DMS SALESPERSON | 8 | SPECIFICATION | 3 |
| | | | | | | | | DMS | 3 |
| | | | | | | | | REVIEW | 2 |

⇨ HISTORIES ARE NARROWED ACCORDING TO USER PROPERTY

1302

| HISTORY ID | iR | DATE OF EXECUTION | FUNCTION | DETAILED SETTING | USER PROPERTY | PURPOSE |
|---|---|---|---|---|---|---|
| 1 | 001 | 2007/4/10 16:18 | Send | ¥¥DMS¥MINUTES¥ 20070410 MINUTES.pdf 300dpi | A | SHARE WITH DMS DEVELOPER |
| 2 | 001 | 2007/4/15 10:00 | Send | ¥¥DMS¥MINUTES¥ 20070415 MINUTES.pdf 300dpi | A | SHARE WITH DMS DEVELOPER |
| 4 | 001 | 2007/5/10 12:00 | e-mail | A@kanon.co.jp | A | SEND TO HIMSELF OR HERSELF |
| 5 | 001 | 2007/5/12 18:00 | e-mail | B@kanon.co.jp | B | SEND TO HIMSELF OR HERSELF |
| 6 | 001 | 2007/5/20 20:00 | Send | ¥¥DMS¥SCHEDULE DMS_SCHEDULE.pdf 300dpi | B | SHARE WITH DMS DEVELOPER |
| 7 | 002 | 2007/5/21 9:00 | RemoteBox | iR : 001 BoxNo.20 IDEA_SHEET.pdf | B | IP ACTIVITY |
| 8 | 001 | 2007/5/30 12:00 | ScanToBox | iR : 001 BoxNo.10 REVIEW_MEMO.pdf | A | SHARE WITH DMS SALESPERSON |

FIG. 13C

⇒ RESULT OF NARROWING FROM WORD LIST

| HISTORY ID | iR | DATE OF EXECUTION | FUNCTION | DETAILED SETTING | USER PROPERTY | PURPOSE |
|---|---|---|---|---|---|---|
| 1 | 001 | 2007/4/10 16:18 | Send | ¥¥DMS¥MINUTES¥20070410 MINUTES.pdf 300dpi | A | SHARE WITH DMS DEVELOPER |
| 2 | 001 | 2007/4/15 10:00 | Send | ¥¥DMS¥MINUTES¥20070415 MINUTES.pdf 300dpi | A | SHARE WITH DMS DEVELOPER |
| 6 | 001 | 2007/5/20 20:00 | Send | ¥¥DMS¥SCHEDULE DMS_SCHEDULE.pdf 300dpi | B | SHARE WITH DMS DEVELOPER |
| 8 | 001 | 2007/5/30 12:00 | ScanToBox | iR : 001 BoxNo.10 REVIEW_MEMO.pdf | A | SHARE WITH DMS SALESPERSON |

1303

F I G. 15

1501

| HISTORY ID | iR | DATE OF EXECUTION | FUNCTION | DETAILED SETTING | USER PROPERTY | PURPOSE |
|---|---|---|---|---|---|---|
| 1 | 001 | 2007/4/10 16:18 | Send | ¥¥DMS¥MINUTES¥20070410 MINUTES.pdf 300dpi | A | SHARE WITH DMS DEVELOPER |
| 2 | 001 | 2007/4/15 10:00 | Send | ¥¥DMS¥MINUTES¥20070415 MINUTES.pdf 300dpi | A | SHARE WITH DMS DEVELOPER |
| 6 | 001 | 2007/5/20 20:00 | Send | ¥¥DMS¥SCHEDULE DMS_SCHEDULE.pdf 300dpi | B | SHARE WITH DMS DEVELOPER |
| 8 | 001 | 2007/5/30 12:00 | ScanToBox | iR : 001 BoxNo.10 REVIEW_MEMO.pdf | A | SHARE WITH DMS SALESPERSON |

⇒ HISTORIES ARE GROUPED TO GENERATE RECOMMENDED FUNCTION / SETTING

1502

| RECOMMENDED ID | FUNCTION | DETAILED SETTING |
|---|---|---|
| 1 | Send | ¥¥DMS¥MINUTES¥EXECUTE_DATE MINUTES.pdf 300dpi |
| 2 | Send | ¥¥DMS¥SCHEDULE DMS_SCHEDULE.pdf 300dpi |
| 3 | ScanToBox | iR : 001 BoxNo.10 REVIEW_MEMO.pdf |

FIG. 16

| DYNAMIC VARIABLE | EXPLANATION |
|---|---|
| EXECUTE_DATE | EXECUTION DATE |
| EXECUTE_TIME | EXECUTION TIME |
| EXECUTE_DATETIME | EXECUTION DATE/TIME |
| PROJECT_NAME | PROJECT NAME |
| SELF_EMAIL | SELF EMAIL ADDRESS |
| SELF_NAME | SELF NAME |
| SELE_DEPTNAME | SELE DEPARTMENT NAME |

FIG. 19

|  |  | From | From |
|---|---|---|---|
| Copy | ⇒ | Scan | RemotePrint |
| ScanToBox | ⇒ | Scan | RemoteBox |
| BoxToPrint | ⇒ | RemoteBox | RemotePrint |

| DEVICE INFORMATION ||
|---|---|
| DEVICE NAME | DEVICE 001 |
| DEVICE ID | 001 |
| FUNCTION | Print |
|  | Scan |
|  | ScanToBox |
|  | BoxToPrint |
|  | Fax |
|  | RemotePrint |
|  | RemoteScan |
|  | RemoteBox |
| APPARATUS | Printer |
|  | Scanner |
|  | Fax |
|  | Finisher |
|  | Trimmer |
|  | Puncher |

| DEVICE INFORMATION | |
|---|---|
| DEVICE NAME | DEVICE 002 |
| DEVICE ID | 002 |
| FUNCTION | Scan |
| APPARATUS | Scanner |

| DEVICE INFORMATION | |
|---|---|
| DEVICE NAME | DEVICE 003 |
| DEVICE ID | 003 |
| FUNCTION | Print |
| | Scan |
| | Box |
| | Fax |
| APPARATUS | Printer |
| | Scanner |
| | Fax |

FIG. 22
```
RECOMMENDED FUNCTION / SETTING
        Send
DESTINATION : ¥¥DMS¥MINUTES¥TODAY_HOLDER
        FILE NAME : MINUTES.pdf
        Send
DESTINATION : ¥¥DMS¥SCHEDULE
        FILE NAME : SCHEDULE.pdf
         Box
     BOX NO. : 001
  FILE NAME : REVIEW_MEMO.pdf
                         TO NORMAL FUNCTION SELECTION→
```
FIG. 23
SELECT A COORDINATED DEVICE
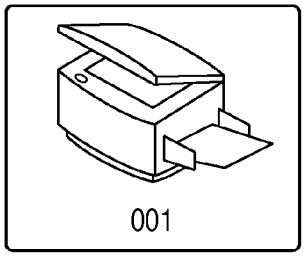
001
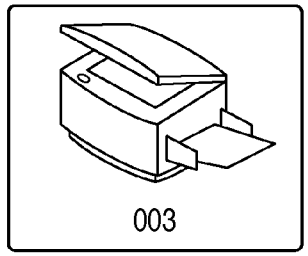
003
TO NORMAL FUNCTION SELECTION→

OUTPUT DEVICE AND ITS CONTROL METHOD FOR MANAGING AND REUSING A JOB HISTORY

BACKGROUND OF THE INVENTION

1. Field of the Invention

The present invention relates to an output device and its control method. More particularly, the present invention relates to an output device that manages and reuses a job history for the purpose of improving convenience, and its control method.

2. Description of the Related Art

Conventionally, a digital multifunction device (also simply referred to as a multifunction device) is provided with a means for storing a history of the execution of a job using a function possessed by the device as job history information, and when executing the job, for calling and reusing the history. Therefore, when the job is newly executed, a detailed setting stored as job history information can be reused, so that the operation of the multifunction device can be simplified. For example, Japanese Patent Laid-Open No. 2003-140854 describes a method for simplifying a setting during printing by retrieving a history using the type or the storage place of a document to be printed with a printer driver, and causing the history to be reflected as a printing setting.

On the other hand, if a multifunction device having a storage function is used, document information can be managed in the multifunction device. A file server or a document management system is already used in many offices, so that the multifunction device provides an additional storage function.

However, even when the technique of Japanese Patent Laid-Open No. 2003-140854 is used, it is difficult to find a useful function that is not known to the user for a job. Thus, it is not always possible to use a function or a detailed setting suitable for the job to be executed.

Moreover, an increasing number of storage devices for storing document information are provided in a user's work environment, such as an office or the like. This makes it more difficult to reuse stored information, such as detailed settings and the like.

SUMMARY OF THE INVENTION

The present invention has been made in view of the background of the art described above. The present invention is to provide an output device for retrieving information highly relevant to a job that is to be newly executed, from records (histories) stored as job history information, and providing a detailed setting, a function or the like of the retrieved history to the user, and its control method.

Accordingly, the present invention has the following configuration.

An output device connected to an information storage storing job history information containing a record having a user ID for identifying an owner of an executed job, property information of document information processed by the job, and a history containing function information indicating a function used in the job, the output device comprises: an acquisition unit, configured to acquire property information about a login user; an extractor, configured to extract, from document information to be processed, property information indicating a property of the document information; an identification unit, configured to identify, from the record of the job history information stored in the information storage, a candidate record having property information about a user matching at least a part of the property information of the login user obtained by the acquisition unit, and history information containing property information of document information matching at least a part of the property information of the document information to be processed that has been extracted by the extractor; a display controller, configured to provide display for designating one of the candidates so as to utilize a function indicated by function information contained in the candidate record; and an executor, configured to execute a job using the function indicated by the function information contained in the candidate record with respect to the document information to be processed, based on the candidate record designated based on the display of the display controller.

According to the present invention, information highly relevant to a job that is to be newly executed can be retrieved from records (histories) stored as job history information, so that a detailed setting, a function or the like of the retrieved history can be provided to the user. Therefore, the convenience of an output device that can utilize a document management device and a document management function can be further improved.

Further features of the present invention will become apparent from the following description of exemplary embodiments with reference to the attached drawings.

BRIEF DESCRIPTION OF THE DRAWINGS

FIG. 10 is a diagram showing an exemplary user property table configuration according to the embodiment of the present invention.

FIG. 11 is a diagram showing an exemplary configuration of a job execution history table according to the embodiment of the present invention.

FIG. 12 is a diagram showing an exemplary configuration of a word frequency list table related to job execution histories according to the embodiment of the present invention.

FIG. 13A is a diagram showing an exemplary configuration of a table during execution of the job execution history narrowing process according to the embodiment of the present invention.

FIG. 13B is a diagram showing an exemplary configuration of the table during execution of the job execution history narrowing process according to the embodiment of the present invention.

FIG. 13C is a diagram showing an exemplary configuration of the table during execution of the job execution history narrowing process according to the embodiment of the present invention.

FIG. 15 is an exemplary configuration of a table during execution of a recommended function/setting generating process according to the first embodiment of the present invention.

FIG. 16 is an exemplary configuration of a detailed setting replacing information table according to the first embodiment of the present invention.

FIG. 19 is a diagram showing an exemplary configuration of a coordinated function table according to the second embodiment of the present invention.

FIG. 20A is a diagram showing exemplary device information according to the second embodiment of the present invention.

FIG. 22 is a diagram showing an exemplary user interface including function/setting buttons that can be selected by a user.

FIG. 23 is a diagram showing an exemplary user interface for allowing a user to select a coordinated device.

DESCRIPTION OF THE EMBODIMENTS

First Embodiment

Hereinafter, the best mode for carrying out the present invention will be described with reference to the accompanying drawings. Firstly, a first embodiment of the present invention will be described with reference to FIGS. 1 to 16.

[System Configuration]

Figure 1:
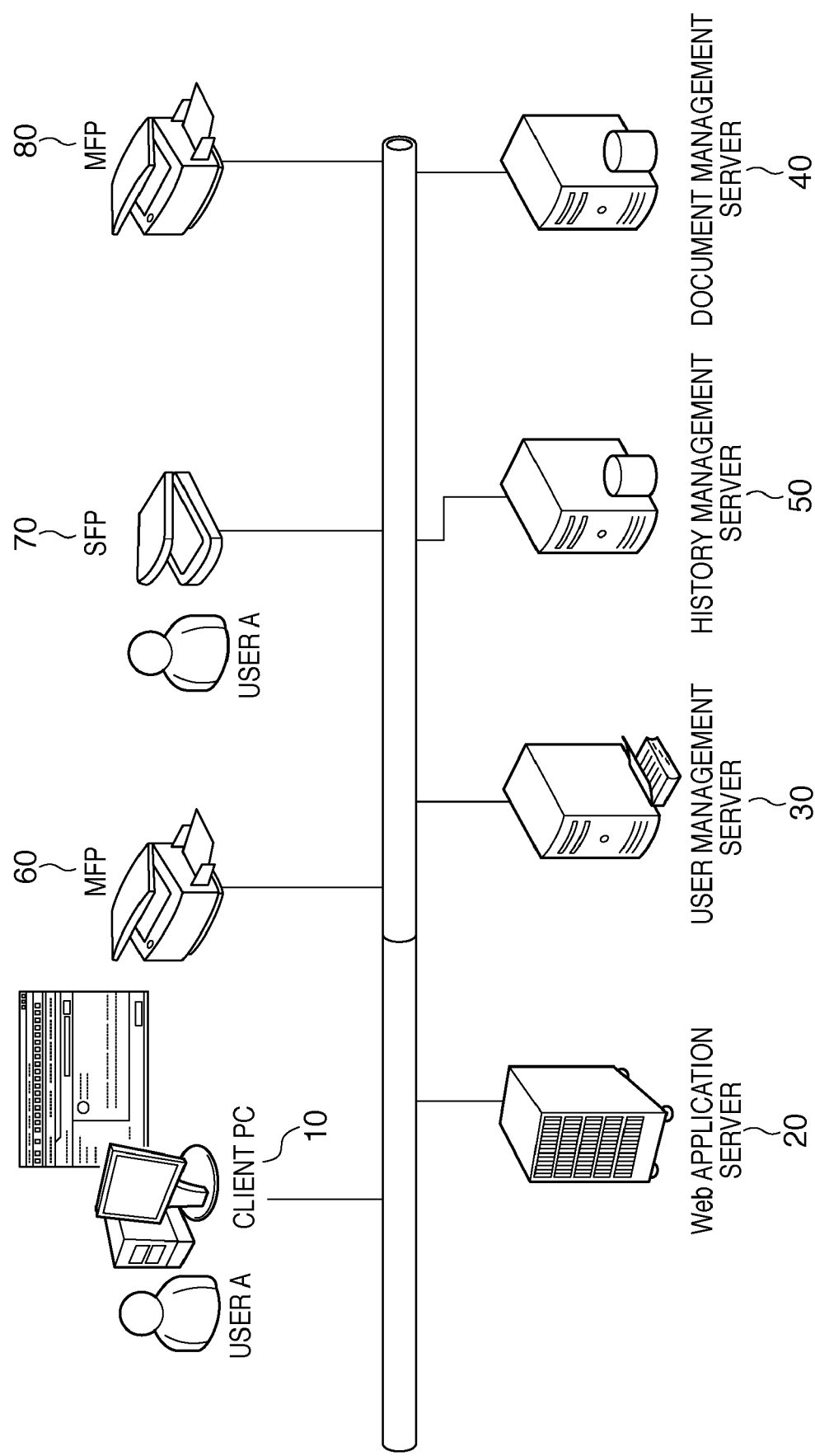
FIG. 1 is a conceptual diagram showing a system according to an embodiment of the present invention.

FIG. 1 is a conceptual diagram showing a system according to an embodiment of the present invention. A client 10 that is used by a user A to access the document management system of this embodiment via a browser, and a Web application server 20 that provides a Web application for the document management system of this embodiment, are connected to the document management system of this embodiment. Further, a user management server 30 that manages information about a user who accesses the system, and a document management server 40 that has a document management service function of storing and managing document information (hereinafter also simply referred to as a document), are connected to the system. Further, the following are connected via a network to the system: a history management server 50 that has a history management service function of storing and managing the job execution history information of an MFP; an MFP 60 that has copier, printer, scanner and fax functions; and an SFP 70 that has only a scanner function. An MFP 80 has a function similar to that of the MFP 60. An MFP is an image forming device that forms an image and an output device that outputs document information. Note that, in this embodiment, the history management server 50 that manages history information is implemented in a separate computer. Alternatively, for example, the history management server 50 may be implemented in an MFP. In either case, the history management server 50 should be provided at a location that can be accessed from a device (e.g., an MFP) within the document management system. The job history information contains a job, such as an executed print job or the like, as a record (history). Each history contains the date of execution, a function or a detailed setting (e.g., a print setting), property information on a job owner (e.g., a user ID for identification), and the like. Moreover, each record (history) also contains a frequent word that has been extracted from the document information processed in a job. Note that whether or not a word is determined as being "frequent" is based on a relative frequency of appearance in a document, in this embodiment. The user's property information (user property) is also simply referred to as user information.

Hereinafter, the MFPs 60 and 80 and the SFP 70 are collectively referred to as "multifunction devices". Although it is here assumed that the Web application server 20, the user management server 30, the document management server 40, and the history management server 50 are separated from each other, they can be provided in a single PC. Although it is also assumed that these services are provided in PCs, they may be provided in the multifunction devices.

Although it is also assumed that the user A operates the client 10, the user may operate the same PC as that of any of the three servers or all the servers. Note that an MFP is a multifunction peripheral device and is also referred to as a digital multifunction device. Also, a server and a client are achieved by implementing software corresponding to respective functions on respective personal computers.

Although it is assumed that the user A accesses the document management system of this embodiment via a browser, a client application may be provided in the client 10 and operated by the user A. In this case, instead of the Web application server 20, a dedicated client application may communicate with the document management server 40.

Hardware Configuration

Figure 2:
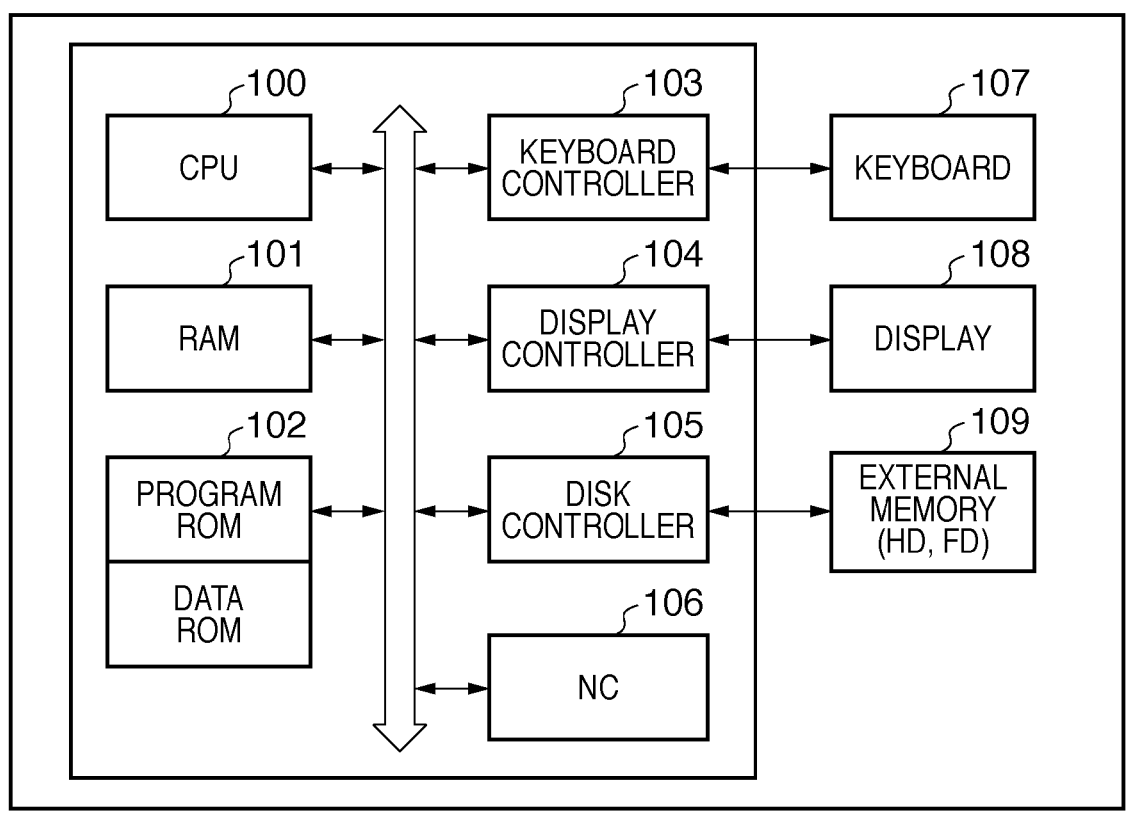
FIG. 2 is a diagram showing a hardware configuration of a PC of each service of the embodiment of the present invention.

FIG. 2 is a diagram showing the hardware configuration of each PC included in the document management system of this embodiment. The hardware configuration diagram of FIG. 2 corresponds to that of a general information processing device. The hardware configuration of a general information processing device is applicable to each PC of this embodiment.

In FIG. 2, a CPU 100 executes a program, such as an OS, an application or the like, that is stored in a program ROM of a ROM 102 or that is loaded from a hard disk 109 to a RAM 101. OS is the abbreviation for an operating system that runs on a computer. Hereinafter, an operating system is referred to as an OS. The processes of the flowcharts described below are achieved by the execution of this program. The RAM 101 functions as a main memory, a work area or the like for the CPU 100. A keyboard controller 103 controls a key input from a keyboard 107 or a pointing device (not shown). A display controller 104 controls the display of various displays 108. A disk controller 105 controls data access to a hard disk (HD) 109, a floppy disk (FD) or the like, which stores various data. An NC 106 is connected to a network and executes a communication control process with respect to other devices connected to the network.

Figure 3:
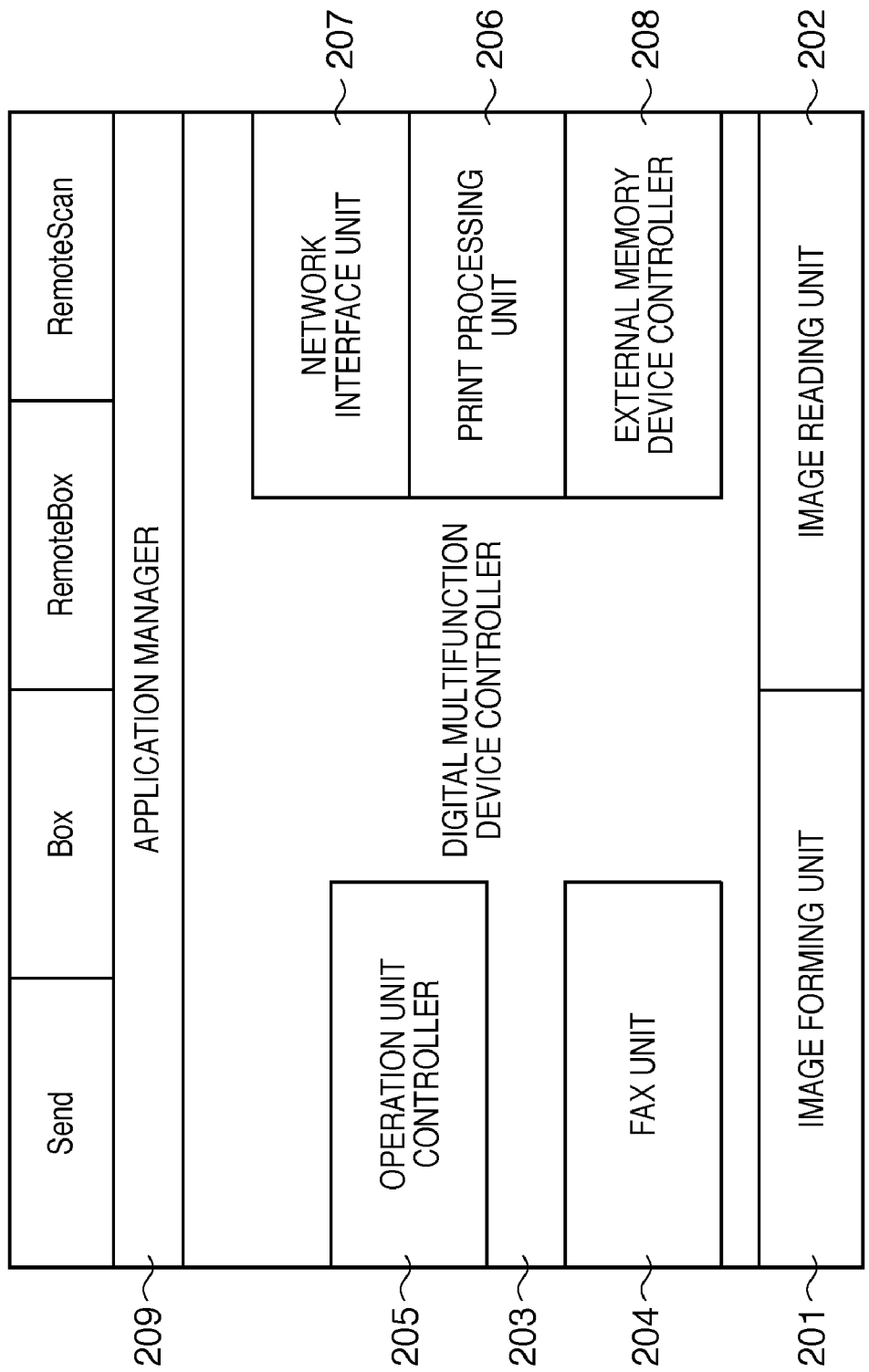
FIG. 3 is a diagram showing a hardware configuration of an MFP according to the embodiment of the present invention.

FIG. 3 is a diagram showing a hierarchical configuration of the digital multifunction device of this embodiment. In FIG. 3, an image forming unit 201 executes a series of image forming processes, such as the handling of paper, the transfer and fixation of an image, and the like, to form an image on a recording medium, such as recording paper or the like. The image forming unit 201 includes, for example, an inkjet printer or an electrophotographic image forming unit. An image reading unit 202 includes a scanner or the like, and optically reads and converts an original image into digital image information. The digital image information may be output to the image forming unit 201, which in turn forms an image, or may be output to a fax unit 204, a network interface unit 207 or the like, which in turn transmits the information via a line.

A digital multifunction device controller 203 controls the operation of the image forming unit 201 and the image reading unit 202. For example, the digital multifunction device controller 203 controls it so that the original information read by the image reading unit 202 is copied by the image forming unit 201. Also, the digital multifunction device controller 203 has a network interface 207, a print processing unit 206, a fax unit 204 and an operation unit controller 205, and controls the communication of information between each unit. The fax unit 204 can transmit and receive a fax image. Specifically, the fax unit 204 can transmit digital image information read by the image reading unit 202, or conversely, can decode a received fax signal and record the resultant signal using the image forming unit 201, for example. The operation unit controller 205 generates a signal, depending on an operation performed by the user using an operation panel of the operation unit, or displays various data or messages on a display unit of the operation unit, for example. The print processing unit 206 processes print data received via the network interface 207 and outputs the resultant data to the image forming unit 201, which in turn prints the data, for example. The network interface unit 207 controls transmission and reception of data to and from other communication terminals via a communication line.

An external storage device controller 208 controls it so that an image read by the image reading unit 202 is converted into a data format that can be stored in an external storage device by the image forming unit 201, and the resultant image can be stored in the external storage device. The external storage device controller 208 also controls it so that stored data is read out, and is then subjected to a print process via the image forming unit 201, or is transmitted via the network interface 207 to an external network.

An application manager 209 manages applications, such as copying, scanning and the like. The application manager 209 manages start-up, termination, the installing and uninstalling of each application, and receives device information generated from the digital multifunction device controller, to control each application.

[Software Configuration]

Figure 4A:
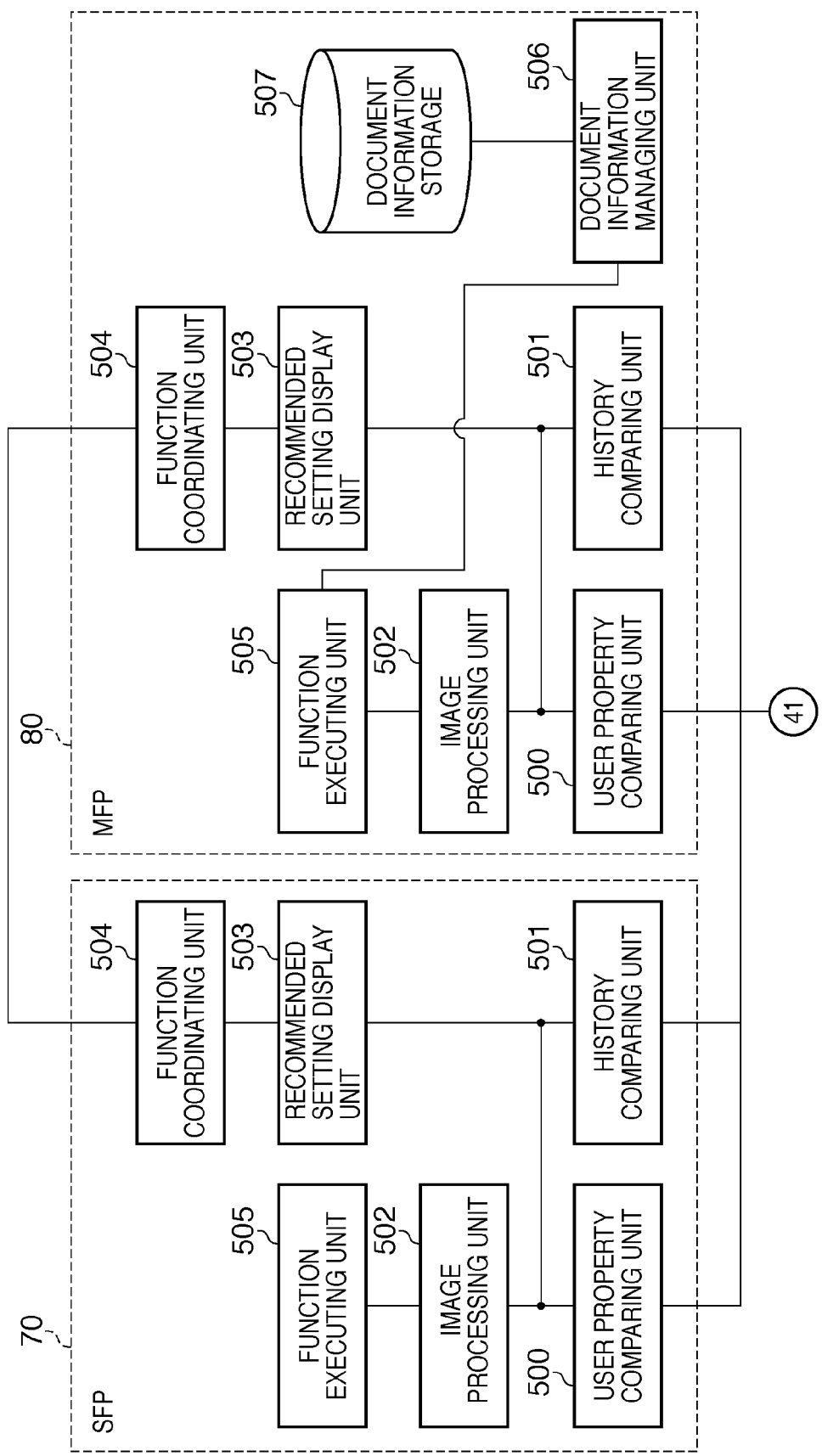
FIG. 4A is a diagram showing a software configuration of the document management system of the embodiment of the present invention.
Figure 4B:
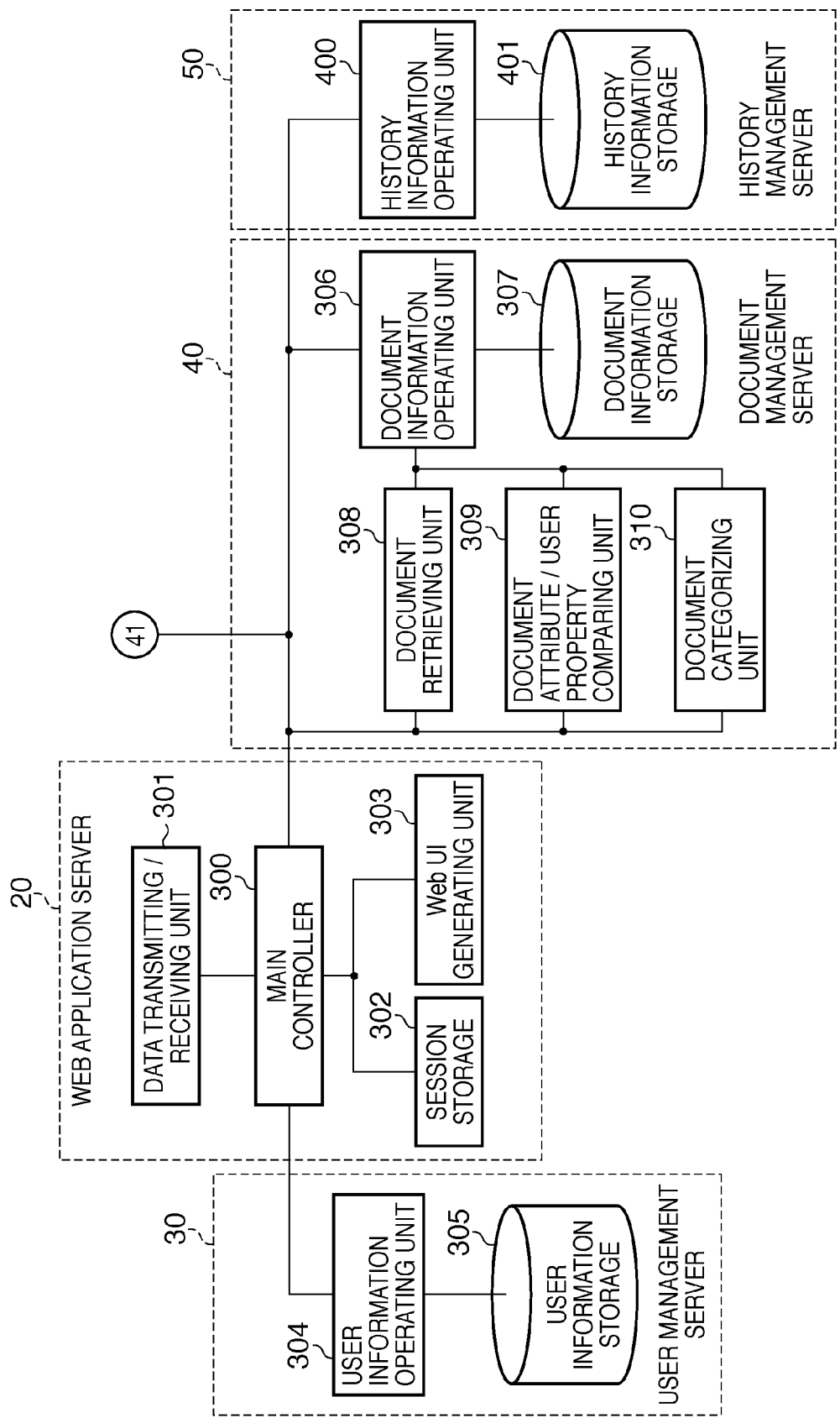
FIG. 4B is a diagram showing the software configuration of the document management system of the embodiment of the present invention.

FIGS. 4A and 4B are diagrams showing an exemplary software configuration of the document management system of this embodiment. FIGS. 4A and 4B show software configurations of the Web application server 20, the user management server 30, the document management server 40, the history management server 50, the SFP 70 and the MFP 80.

<Web Application Server 20>

A main controller 300 controls not only the Web application server 20, but also the whole document management system of this embodiment, and instructs and manages each unit described below.

A data transmitting/receiving unit 301 receives a command that is issued by a user via a browser in the client 10, and returns the result of an instruction received from the main controller 300 to the client 10.

A session storage 302 generates session information for indicating that after a user accesses this document management system via a browser in the client 10, the same user accesses this document management system. The session storage 302 also holds, in coordination with the session information, various pieces of information used repeatedly until a user stops accessing this document management system (logout) or until a session is ended (automatic time-out, etc.).

A Web UI generating unit 303 receives an instruction from the main controller 300 to generate a Web UI (HTML), depending on a situation. Here, the Web UI generated by the Web UI generating unit 303 is not limited to HTML. A script language, such as JavaScript (registered trademark) or the like, may be embedded within the Web UI.

<User Management Server 30>

Next, a user information operating unit 304 performs an operation in accordance with an instruction from the main controller 300. The operation includes retrieval, editing, storage, and the like of a user who can access this document management system and a property of the user (user information), the user and the user property being stored in the user information storage 305. Here, the user management in this document management system is not an original technique. The user information operating unit 304 may be performed in coordination with a known technique, such as ActiveDirectory, LDAP or the like, and only the user property may be stored in the user information storage 305.

<Document Management Server 40>

A document information operating unit 306 performs an operation in accordance with an instruction from the main controller 300. The operation includes registration, storage, extraction, editing, and the like of a document and an attribute of the document that are stored in a document information storage 307. The document attribute includes a statistical value of the frequency of appearance (also referred to as an appearance frequency) of a term (word).

A document retrieving unit 308 determines a method for retrieving a document, retrieves a document satisfying given retrieval conditions from the document information storage 307 via the document information operating unit 306, and obtains the retrieval result, in accordance with an instruction from the main controller 300.

A document attribute/user property comparing unit 309 compares a document attribute with a user property in accordance with an instruction from the main controller 300.

A document categorizing unit 310 categorizes a document, depending on the attribute, and returns the result of categorization to the main controller 300, in accordance with an instruction from the main controller 300.

<History Management Server 50>

A history information operating unit 400 performs an operation in accordance with an instruction from the function executing unit 505. The operation includes reference to job history information stored in a history information storage 401, registration and storage of a history of a job executed in the SFP 70 or the MFP 80, and the like. An attribute of history is related to a statistical value of the frequency of appearance (also simply referred to as an appearance frequency) of a term (word) used in an executed document for each job, for example.

<SFP 7 and MFP 80>

A user property comparing unit 500 acquires user information about a login user and execution user information contained in a job history from the user management server 30, to determine the similarity of a user property.

A history comparing unit 501 acquires job history information from the history management server 50 and determines a similarity between histories. Particularly, the history comparing unit 501 determines a similarity between a setting of a job that was executed in the past and a setting of a job that is about to be executed.

An image processing unit 502 performs an OCR process with respect to a scanned image to extract text information (extraction process).

A recommended setting displaying unit 503 displays a recommended function/setting that is generated based on the result of a process by the user property comparing unit 500 and the result of a process by the history comparing unit 501, as a selectable button, on the operation unit controller 205.

A function coordinating unit 504 connects to another MFP or SFP via a network to search for a device or a function that can be coordinated.

The function executing unit 505 controls hardware, such as the image forming unit 201, the image reading unit 202, the external storage device controller 208, or the like, in the multifunction device as required, so as to process a job selected by the recommended setting displaying unit 503.

A document information managing unit 506, for example, stores an image generated by the image reading unit 202 and its attribute to a document information storage 507, or references or retrieves an image and its attribute from the document information storage 507, in accordance with an instruction from the function executing unit 505.

[Login and User Property Registration Process]

Hereinafter, the process of each step in the document management system of the first embodiment of the present invention will be specifically described with reference to FIGS. 5 to 16.

Figure 5:
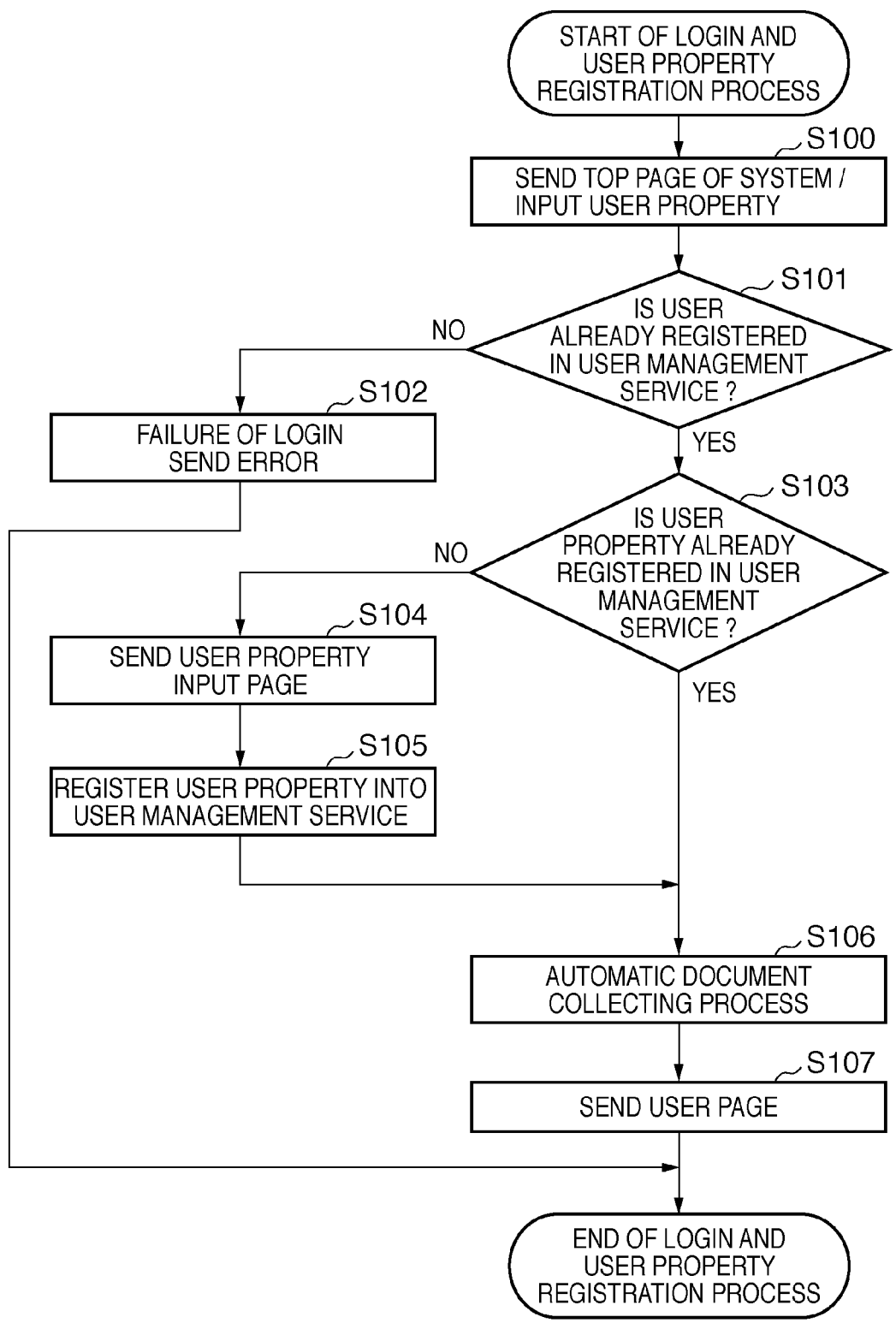
FIG. 5 is a flowchart showing a login and user property registration process in the MFP of the embodiment of the present invention.

The user A accesses (logs in) this document management system via a browser on the client 10, and if this is the first time the user A logs in, inputs a user property. The input user property is transferred via the Web application server 20 to the user management server 30 and is then stored into the user information storage 305. FIG. 5 is a flowchart showing a flow of a process performed by this document management system during a login and user property registration process. FIG. 5 shows a procedure performed by the Web application server 20.

When the user A accesses the top page of this document management system via a browser on the client 10, the Web application server 20 receives a request at the data transmitting/receiving unit 301. In response to the request, the main controller 300 of the Web application server 20 requests the Web UI generating unit 303 to generate the top page (step S100). Next, the top page of this document management system is transmitted as a response via the data transmitting/receiving unit 301 to the client 10. A browser on the client 10 displays the received top page.

Next, the user A inputs login information on the top page displayed in S100. In response to this, the main controller 300 receives the login information of the user A. The main controller 300 that has received the login information of the user A asks the user information operating unit 304 to find out whether or not the user A is already registered in the user information storage 305 (step S101). For example, this is achieved by checking a user ID and a password contained in the login information against user IDs and passwords that have been previously registered by users. As a result, if the user A does not exist in the user information storage 305 or an input password is wrong, the user information operating unit 304 responds by indicating that fact (the user A is not registered). In step S102, the main controller 300 receives the response, requests the Web UI generating unit 303 to generate a login failure error page, and returns the error page as a response via the data transmitting/receiving unit 301 to the client 10. The browser on the client 10 displays the login failure error page.

When the user A is registered in the user information storage 305, the main controller 300 generates and stores session information into the session storage 302. In step S103, the main controller 300 asks the user information storage 305 to find out whether or not the user property of the user A is registered in the user information storage 305. Note that the timing with which session information is generated is not limited.

When it is determined in step S103 that the user property of the user A is not registered, the main controller 300 requests the Web UI generating unit 303 to generate a user property input page (step S104). Next, the main controller 300 returns the user property input page as a response via the data transmitting/receiving unit 301 to the client 10. A browser on the client 10 displays the received user property input page.

In step S105, when the user A inputs a user property on the user property input page displayed on the client, the main controller 300 receives the user property of the user A via the data transmitting/receiving unit 301. Next, the main controller 300 instructs the user information operating unit 304 to register the user property of the user A to the user information storage 305. In this case, the main controller 300 also instructs the session storage 302 to hold the user property as well as the session information that has already been generated. Therefore, it is not necessary to acquire user property information of the user A from the user information storage 305 each time, so that the processing speed can be improved.

FIG. 10 shows an exemplary user property and an exemplary user property table 1001 stored in the user information storage 305. As shown in FIG. 10, the user property includes items indicating attributes of a user, such as a user name (user ID), a department, a post (position), business in charge, a project name, an e-mail address and the like. For example, the business in charge includes one in a department and one in a project. These user properties are utilized in a history narrowing process described below. Note that other pieces of information may be included as user properties. Moreover, a user property item may include a plurality of values. For example, when a user is involved in a plurality of projects, it is preferable that a plurality of values can be selected.

Also, it is desirable that a user select options on the user property input page without freely inputting a user property item. This is because checking becomes difficult if a user is allowed to freely describe a user property item. Therefore, it is desirable that an administrator or the like previously set appropriate selection items and options, depending on a user environment into which this document management system is introduced.

Next, in step S106, an automatic document collecting process depending on the user property of the user A is executed.

Next, in step S107, the main controller 300 causes the Web UI generating unit 303 to generate a page of the user A using contents that have been collected and categorized, depending on the user property of the user A in step S106. Next, the main controller 300 returns the page of the user A as a response via the data transmitting/receiving unit 301 to the client 10, so that the page of the user A is displayed by a browser on the client 10.

By the aforementioned procedure, the user property of a user who has successfully logged in is guaranteed to be stored. Also, documents are collected, depending on the user property or the like of the login user.

By the aforementioned procedure, a user can log in from a client and register their user property.

[Recommended Function/Setting Generating Process]

Figure 6:
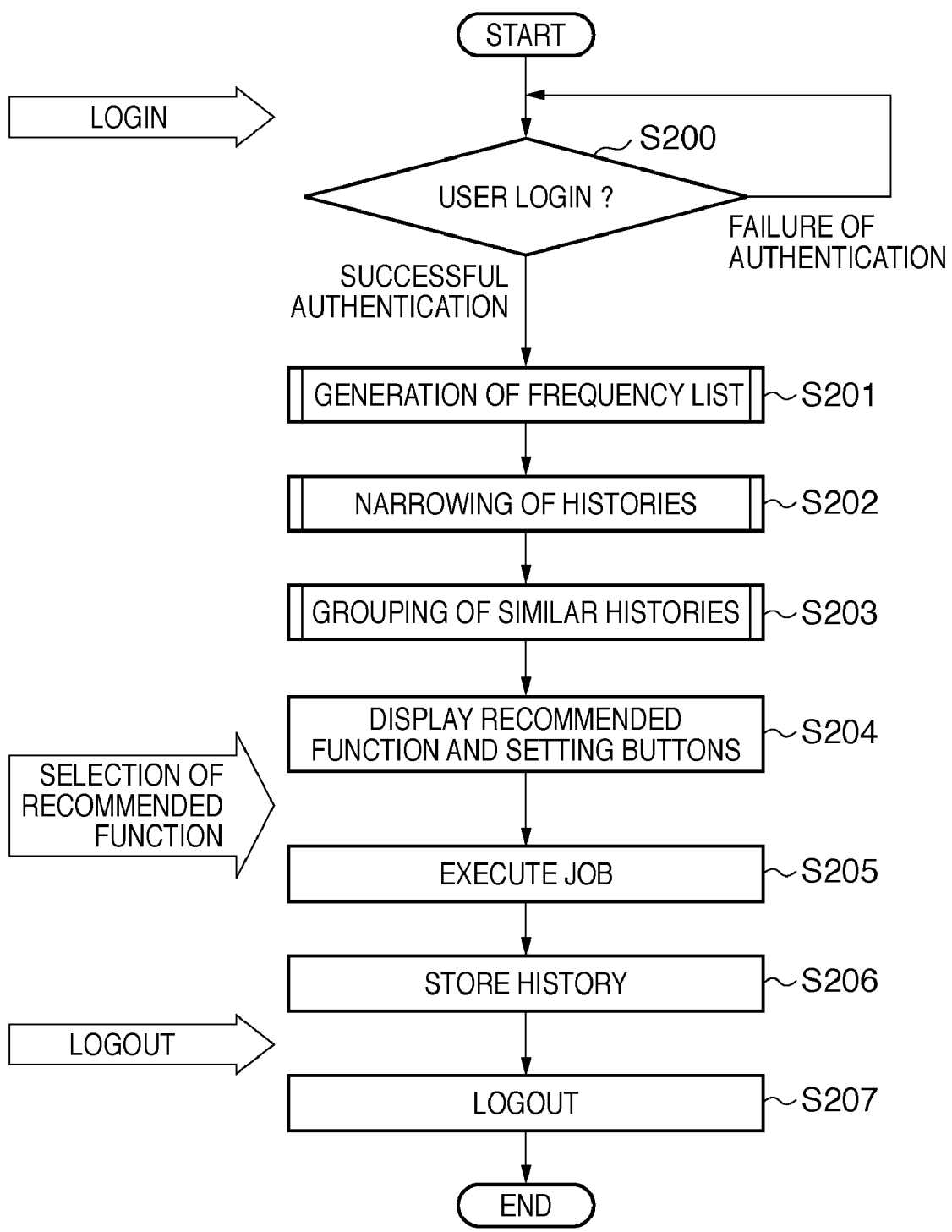
FIG. 6 is a basic flowchart showing a login process, a history narrowing process, and a similar history grouping process in an MFP according to a first embodiment of the present invention.
Figure 7:
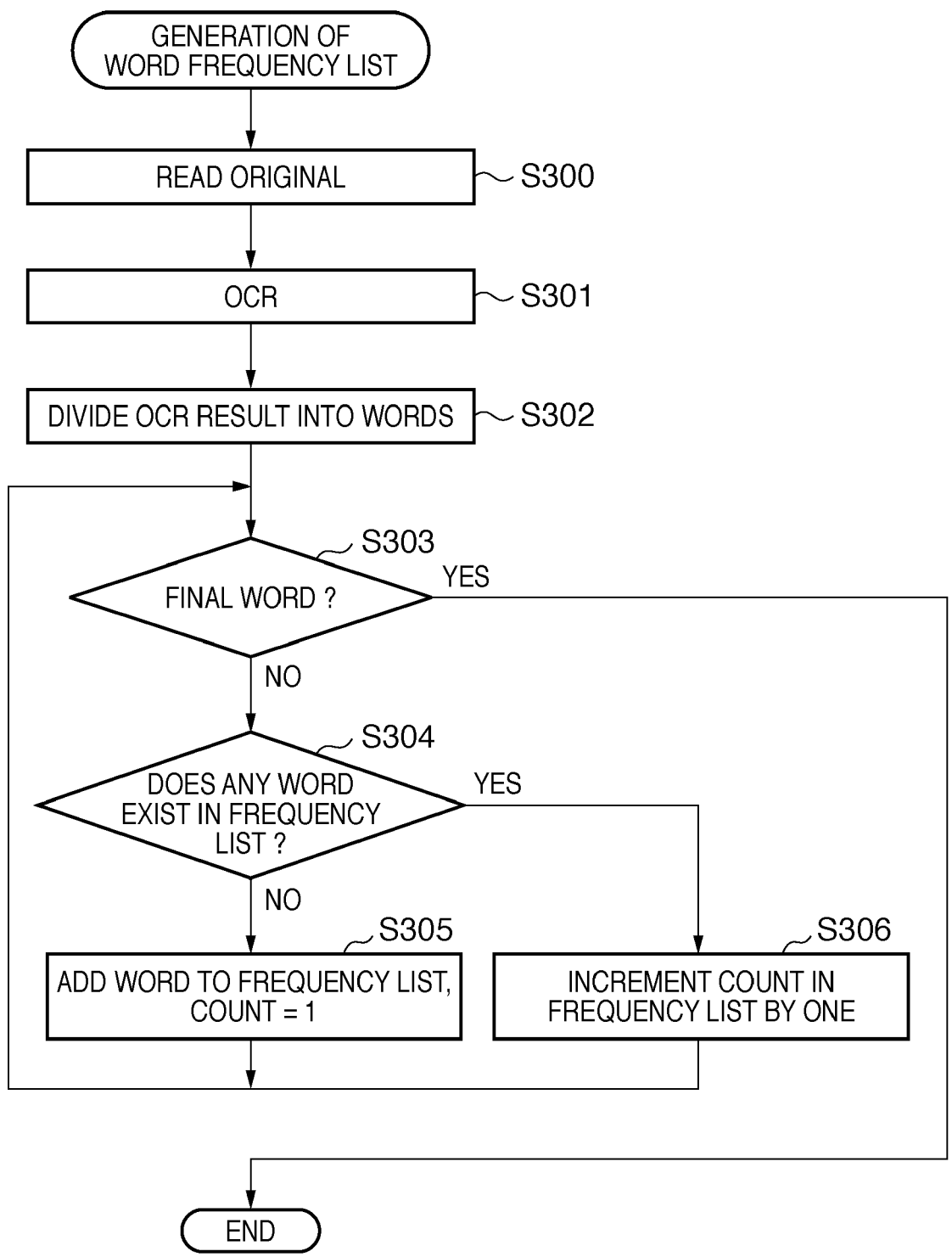
FIG. 7 is a flowchart showing an OCR process and a word appearance frequency list generating process in the MFP of the embodiment of the present invention.
Figure 8:
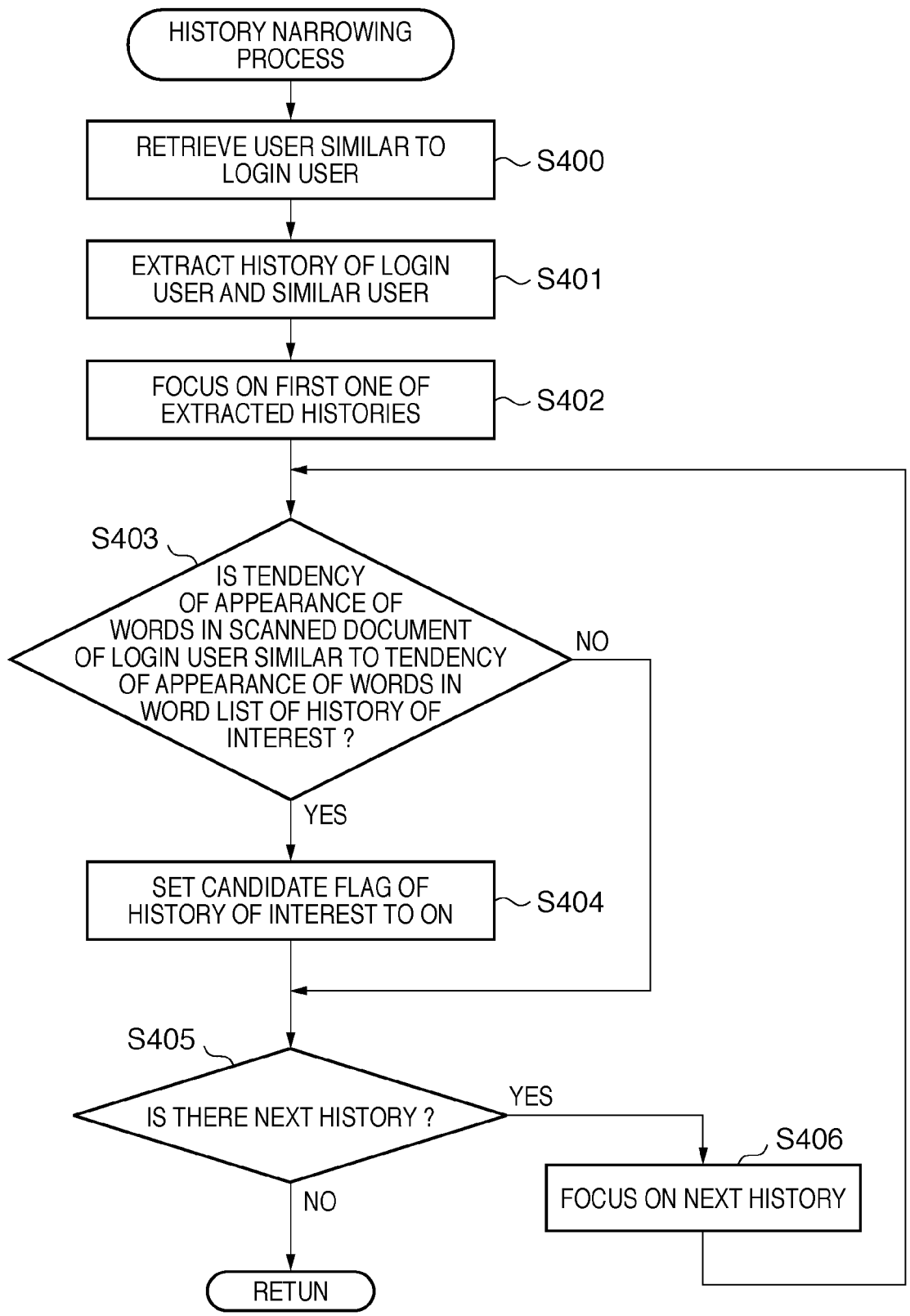
FIG. 8 is a flowchart showing a history information narrowing process in the MFP of the embodiment of the present invention.
Figure 9:
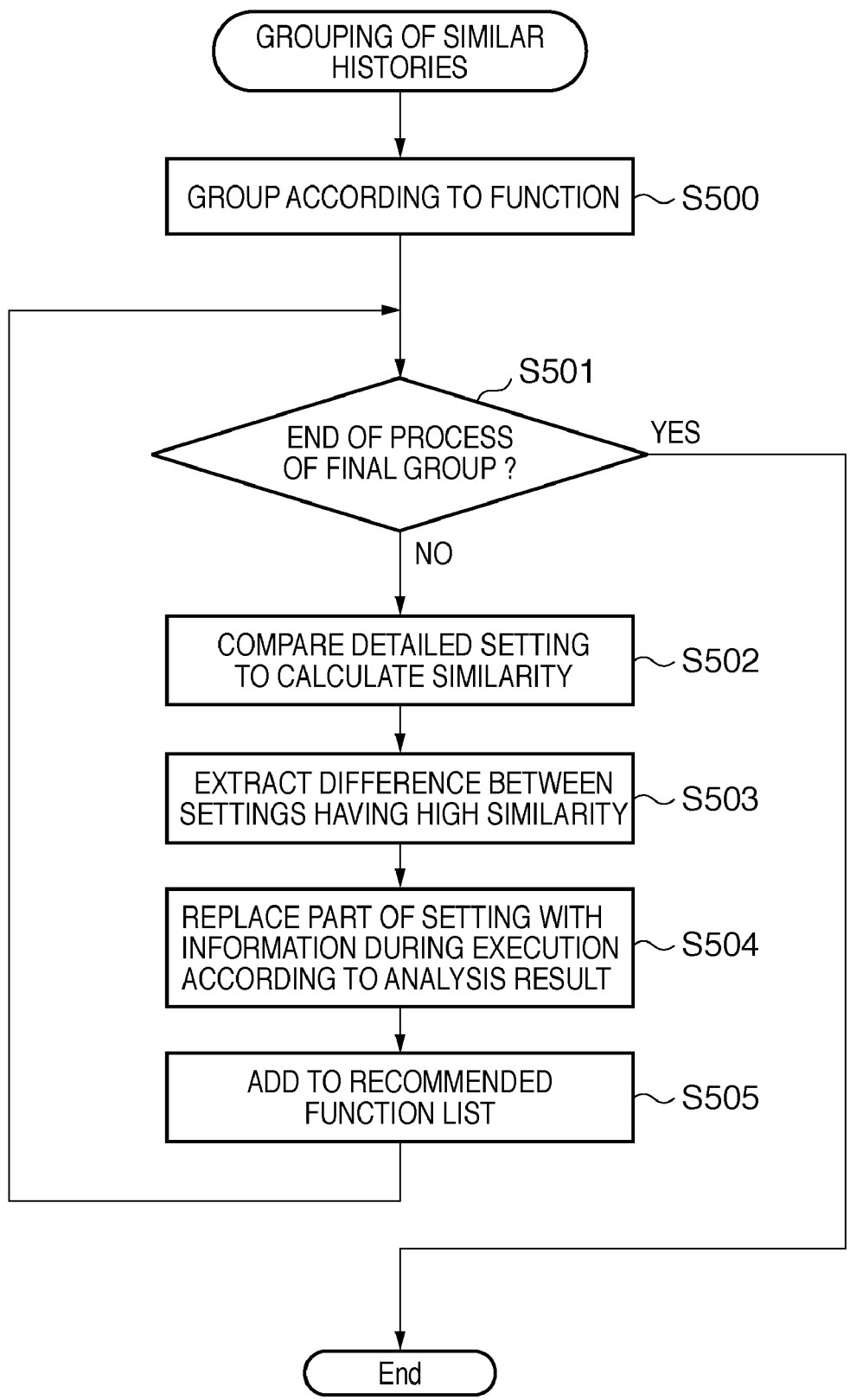
FIG. 9 is a flowchart showing a recommended function/setting generating process in the MFP of the embodiment of the present invention.

A user logs in to a multifunction device via an operation unit of the multifunction device, and executes a function of the multifunction device. FIG. 6 is a basic flowchart of a process of the multifunction device, showing a flow of the recommended function/setting generating process in this system. FIGS. 7, 8 and 9 are flowcharts showing processes in the basic flowchart. FIGS. 13A to 13C and 15 are data tables showing transition of data in the basic flowchart. FIGS. 11 and 12 show examples of history information about executed jobs. Hereinafter, the recommended function/setting generating process will be described in detail with reference to these figures.

In step S200, the user A inputs login information to the multifunction device. In response to this, the main controller 300 that has received the login information of the user A at the data transmitting/receiving unit 301 asks the user information operating unit 304 to find out whether or not the user A is registered in the user information storage 305. As a result, if the user A does not exist in the user information storage 305 or an input password is wrong, the main controller 300 displays the fact that authentication has failed, and repeats step S200. If the authentication is successful, control goes to step S201. If the authentication is successful, it is assumed that the user property of the user has already been registered by the process of FIG. 5 performed via an operation of the client 10.

When the user A instructs the image reading unit 202 to scan an original placed thereon, the image reading unit 202 scans the original in accordance with the instruction to perform an appearance frequency list generating process with respect to words written in the original (step S201). This step will be described in detail below with reference to FIG. 7. Note that the scanned original is document data to be processed. An appearance frequency list is generated by counting the number of times of appearance of a word. FIG. 12 shows an exemplary appearance frequency list 1201 related to history information. An appearance frequency list is related to each history ID. In step S201, a list of frequencies of words in the scanned document is generated instead of a history. Specifically, a list in which words are related to respective appearance frequencies is generated (see a list 1202). Although FIG. 12 shows only the top three words as an example, the frequencies of all appearing words are counted during generation of the list.

Next, in step S202, a record related to the user A and the original placed on the image reading unit 202 by the user A is retrieved from job history information managed by the history management server 50. Note that the retrieval is performed by referencing a job history contained in the record, it may be described that "a job history is retrieved" in the descriptions that follow. This step will be described in detail below with reference to FIG. 8. FIG. 11 shows exemplary job history information. In the job history information, a history for each job is contained as a record, and is assigned a history ID. Each record (history) records a device ID of a multifunction device or the like that has executed a job, the date of execution of the job, a function executed in the job, a detailed setting of the job, a user property (a user ID, etc.) of a job owner, a purpose, and the like. The word appearance frequency list of FIG. 12 is also stored and related to history IDs, and therefore, can be considered as a part of the history information.

Next, in step S203, the job histories acquired in step S202 are grouped according to similar settings of the same function to generate a recommended function/setting list. This step will be described in detail below with reference to FIG. 9. Specifically, histories contained in the job history information are divided into groups each of which has similar settings (similar histories). Note that step S203 does not have to be performed, but step S203 is executed in this embodiment.

Next, in step S204, information indicating a recommended function/setting button corresponding to the recommended function/setting list (also referred to as a recommended function setting list) generated in step S203 is transmitted to the MFP 80 or the SFP 70. The MFP 80 or the SFP 70 receives the recommended function/setting button information via the operation unit controller 205, and displays a button that can be designated by the user (FIG. 22). FIG. 22 shows exemplary buttons. In FIG. 22, each displayed button indicates a pair of a function extracted as a recommended function/setting and its setting. Each recommended function/setting button is related to a corresponding job history.

Next, when a button displayed in step S204 is selected, a function stored as a job history that is related to the selected recommended function/setting button is executed with a stored setting (step S205). Note that the setting does not have to be completely the same as that of the job history, and a time, a date, a mail address and the like may be replaced with appropriate values during execution as required.

Next, in step S206, the user name received in step S200, the word appearance frequency list generated in step S201, and a history of a job executed in step S205, are transmitted to the history management server 50. The history management server 50 registers the received information in association with a new history ID. Note that the word appearance frequency list may contain only a word or words having frequencies that are limited to a predetermined rank or higher. Next, in step S207, the login information is discarded and this process is ended.

By the aforementioned procedure, a function and a setting of a job that is to be applied to a newly scanned document, can be selected from their candidates, that is, functions and settings of jobs that were executed by users having a similar user property in the past and that are similar to that job. Therefore, it is possible to set a job easily and correctly.

[Word Appearance Frequency List Generating Process]

FIG. 7 is a flowchart showing a process of extracting a character string written in an original to generate a word appearance frequency list. The process corresponds to step S201 of FIG. 6. Hereinafter, the process will be described in detail with reference to FIG. 7.

In step S300, an original placed on the image reading unit 202 by the user A is scanned to generate image data.

Next, in step S301, the read image data is subjected to an OCR process to extract a character string written in the original. In other words, a character image is recognized and converted into a character code.

Next, in step S302, the extracted character string is subjected to morphological analysis and then word recognition, so that the string is divided into words. The division into words is referred to as word division. The recognized words are collected as characteristic information indicating a characteristic of the document, and therefore, for example, may be only the stems of nouns or verbs or may be only of a particular part of speech.

Next, in step S303, words obtained by word division of character strings are subjected to the following step from the leading word. This process is ended if the final word of the character strings is reached.

In step S304, it is determined whether or not a word recognized in step S302 is already registered in the appearance frequency list that is being generated. The appearance frequency list is empty at the beginning of generation. If it is determined that a corresponding word is not registered, control goes to step S305, in which a record containing the recognized word is added to the appearance frequency list, and a counter in the record is set to "1" (i.e., the initial value of the appearance frequency is set to 1). If a corresponding word exists, a counter (i.e., an appearance frequency) corresponding to the word is incremented by "1". If step S305 or S306 is completed, control returns to step S303, in which the aforementioned process is repeated.

The generated appearance frequency list is desirably sorted according to appearance frequency before being stored. Note that, during the generation of the appearance frequency list, words may be sorted according to the code into a structure that allows quick word retrieval, such as a table, a binary search tree or the like. Also, the appearance frequency list is stored in association with history IDs assigned to respective jobs. Also, the number of records stored as the appearance frequency list may be either fixed or changeable.

[History Information Narrowing Process]

FIG. 8 is a flowchart of a process of retrieving and identifying a history of a job from job history information, where the job is one that has been executed by a user having a user property similar to that of a login user and in which an original similar to an original placed on the image reading unit 202 has been processed. FIG. 8 shows details of step S202 of FIG. 6. FIGS. 13A to 13C and 14 show transition of job history information in this process. Note that these figures are for the purpose of visually showing a narrowing process, and the stored job history information is not processed in such a manner. Hereinafter, the history information narrowing process will be described in detail with reference to FIGS. 8, 13A to 13C and 14.

In step S400, the user management server 30 is instructed to retrieve a name of a user having a user property similar to that of a login user. When user properties are similar to each other, the user properties have at least one item having the same value therebetween. In this example, as shown in FIG. 10, a user A and a user B have the same value of the project item of the user property items. Therefore, when a user similar to the user A is searched for, the user B is retrieved since the users A and B have the same project item value (they belong to the same project). Alternatively, a user (administrator) may select at least one of the items of the user property, and when users have the same value of the selected item, the users may be considered to be similar to each other.

Next, in step S401, the histories of jobs that were executed in the past by the login user and a similar user retrieved in step S400 are extracted from the job history information. The job history information contains the user property (e.g., a user ID, etc.) of a job owner that has executed a job. A history containing the corresponding user property (here, a user ID) is retrieved. A table 1302 of FIG. 13B is the result of step S401. Specifically, histories (history IDs 1, 2, 4, 5, 6, 7, 8) of jobs that were executed in the past by the users A and B are retrieved. Therefore, the table 1302 is obtained by removing the job history of the history ID=3 from the table 1301 of FIG. 13A.

Next, in step S402, the job history extracted in step S401 is focused on from the leading record, and thereafter, the following step is performed.

In step S403, the appearance frequency list of a document scanned by the login user that has been generated by the word appearance frequency list generating process and the appearance frequency list of words related to the job history of interest are compared to determine whether their tendencies are similar to each other. In other words, this step is to extract a history of a job that deals with a document that is similar to that which has been scanned by the login user. In this example, histories are determined as being similar to each other when the histories have the same word having a high appearance frequency. Specifically, referring to FIG. 14, histories in which a word "DMS" having a highly ranked frequency in the appearance frequency list of a document scanned by the login user is highly ranked in the word list, are determined to be similar to each other. Here, the history IDs 1, 2, 6 and 8 are similar to each other. Note that when a similarity is determined, histories may be determined to be similar to each other when the histories have the same set of words in their lists. More strictly, histories may be determined to be similar to each other when the same word sets have the same appearance frequency order. In step S403, when the job history of interest is determined as being of a job that has dealt with a document that is similar to one which has been scanned by the login user, control goes to step S404, in which the job history of interest is set as a candidate for a recommended function/setting, so that a candidate flag of the job history is set to ON (value 0 to 1).

In step S405, it is determined whether or not there is another job history to be focused on of the job histories extracted in step S401. If there is another job history to be focused on, control goes to step S406, in which the next job history is focused on and the process of step S403 is performed.

In step S405, if there is no other job history to be focused on of the job histories extracted in step S401, this process is ended. In step S405, a job history whose candidate flag is set to ON is one that is extracted as a candidate for recommended function/setting information.

Figure 14:
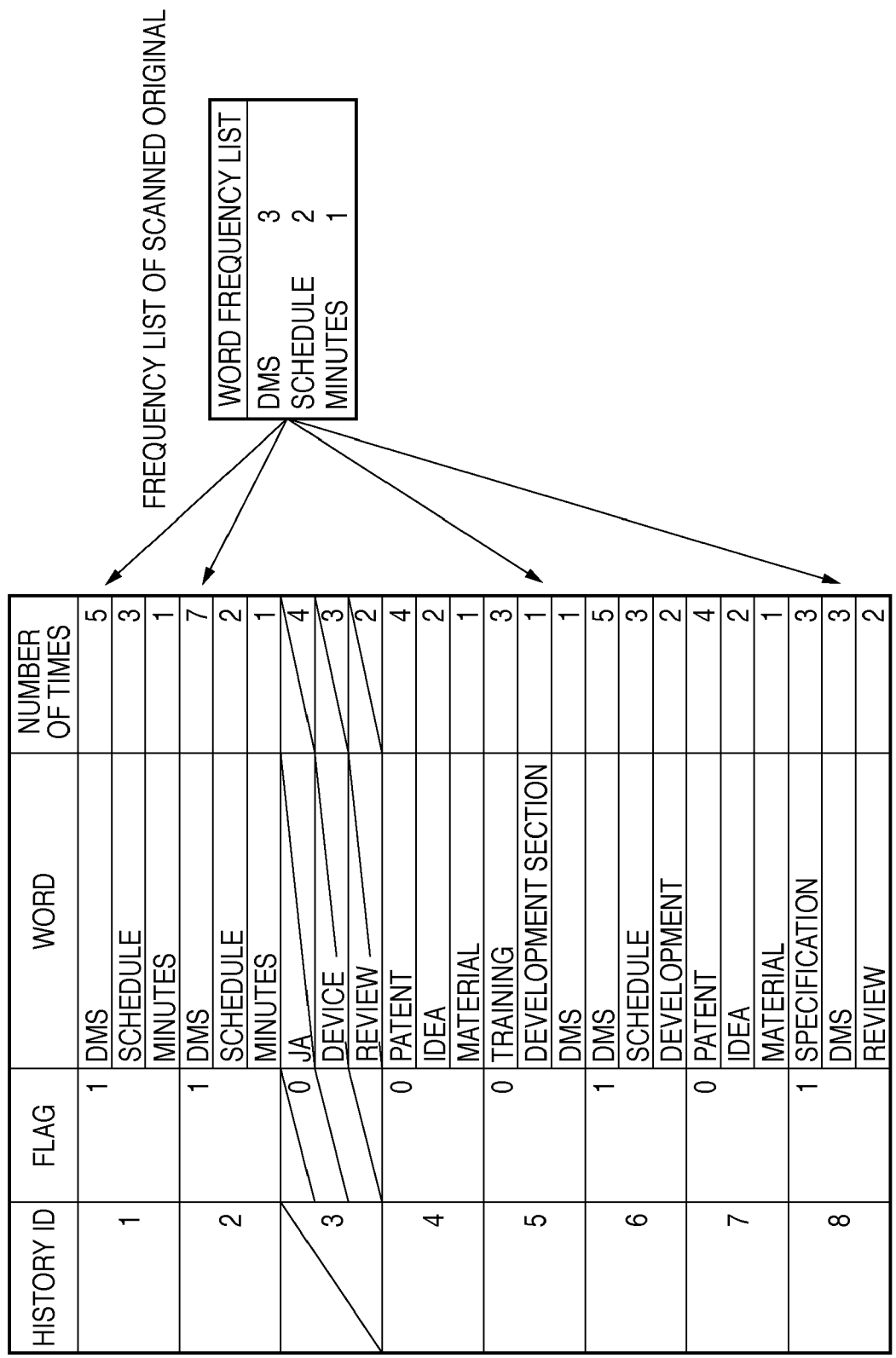
FIG. 14 is a diagram showing an exemplary configuration of the table during execution of the job execution history narrowing process according to the embodiment of the present invention.

FIG. 14 shows the process of steps S402 to S406. A table 1303 of FIG. 13C shows a final result of the process. A word appearance frequency list 1402 is the appearance frequency list of words in the login user's scanned original generated in step S201. Appearance frequency lists 1401 are appearance frequency lists of words related to job histories retrieved in step S401. In FIG. 14, "DMS", "schedule" and "minutes" are registered in order of frequency in the word appearance frequency list 1402 of the scanned original (scanned document). The word appearance frequency lists 1401 are lists that are related to job histories that have the same user IDs as those of the login user and the similar users. Here, since a candidate flag only needs to clearly indicate relation to a job history, the job history does not have to actually contain the candidate flag item. The table 1303 of FIG. 13C shows the result of the narrowing process.

[Recommended Function/Setting Generating Process]

FIG. 9 is a flowchart of a process of generating, for a login user, a more appropriate function/setting as recommended button information based on the result of the history narrowing process. FIG. 9 shows details of step S203 of FIG. 6. FIG. 15 shows an example of generation of a recommended function/setting. Hereinafter, the recommended function/setting generating process will be described with reference to FIGS. 9 and 15.

In step S500, job histories are grouped according to function. In this example, job histories whose candidate flags are ON of FIG. 15 are divided into a group whose function is "Send" (history IDs 1, 2 and 6) and a group whose function is "ScanToBox" (after scanning, storing into a BOX) (history ID 8). Here, the BOX is a storage region for storing print data or scanned data in the image forming device. Data stored in the BOX is sent to the outside via printing, e-mail or the like in accordance with an additional instruction that is input on an operation panel by a user. Also, a state of the BOX can be browsed and data in the BOX can be operated by an external PC or the like.

Next, in step S501, the following step is performed for each group. If the final group has been processed, this process is ended.

In step S502, job histories belonging to a group of interest are compared in terms of detailed setting information to calculate their similarity. The comparison is performed for all possible combinations of the job histories, for example.

The comparison is also performed between character strings indicating detailed settings, for example. For example, a similarity is calculated by comparing two character strings from the leading characters to count matching characters. Alternatively, moreover, the ratio of the number of matching characters to the number of characters contained in a character string may be used as a similarity. Alternatively, if a mismatch between characters occurs at a focus point of the character strings, it is determined whether there is a character ahead of the focus point of one character string that matches a character at the focus point of the other character string, and if the result of determination is positive, the comparison may be resumed with the focus points being set to these matching characters. Also in this case, the number of matching characters is a similarity. The number of matching characters at the time when the focus point reaches the final character of one of the character strings, is a similarity. Also in this case, the ratio of the number of matching characters to the number of characters contained in a character string may be used as a similarity. These calculation methods are only for illustrative purposes. For example, if a job history contains a plurality of character strings, the number of matching character strings may be calculated and used as a similarity.

In this example, the difference in character string indicating a path between the history ID 1 and the history ID 2 is one character. Therefore, the calculated similarity is high. On the other hand, for the history ID 1 and the history ID 6, the character strings indicating a path have only three matching characters, and the character strings indicating file names do not match, except for their extensions, so that the calculated similarity is low. The same is true of the history ID 2 and the history ID 6.

In step S503, job histories having high similarity are compared, and a difference (character string) therebetween is extracted as a specific portion for each job. Moreover, information having the same meaning as that of a word containing the difference character string is detected from the job history. In this example, as shown in an upper portion of FIG. 15, for the history ID 1, the difference character string from the history ID 2 is a character "0" that is the final character of the character string indicating a path. The word containing the character "0" is "20070410". The same is true of the history ID 2.

Next, in step S504, a variable having the same meaning information of the word detected in step S503 is retrieved from a table of FIG. 16. Also, the detailed setting of the history is replaced with the retrieved variable to generate a recommended function/setting. The same meaning information of "20070410" is a history execution date. Therefore, "20070410" of the history ID 1 is replaced with a variable EXECUTE_DATE meaning a history execution date. The reason why "20070410" is determined as a history execution date is that this can be determined as a number indicating a year, a month and a day. For example, if a character string contains an eight-digit number, it is determined whether or not the number indicates a date, such as "year-month-day", "month-day-year", "day-month-year" or the like. If the eight-digit number is assumed to indicate "year-month-day", "month-day-year", "day-month-year" or the like, then when the eight-digit number does not fall within actually possible dates, the eight-digit number can be determined not to be a date. If the eight-digit number falls within actually possible dates, the eight-digit number is determined to be a date. Dates include only "dates of execution" as shown in FIG. 16. Therefore, the eight-digit number is replaced with a dynamic variable EXECUTE_DATE as a value indicating a date of execution. Thus, it is determined whether or not the number of digits and the range of a number of the specific portion contained in the detailed setting of a character string falls within actually possible dates, and if the number is a date, the number is considered to be a date of execution and is replaced with the dynamic variable.

Similarly, for a time or a date and time, it is determined whether or not the number of digits and the range of a number fall within actually possible times or dates and times. If the result of determination is positive, the number is interpreted as a time or a date and time of execution, the number is replaced with a corresponding dynamic variable.

For project name, mail address, name, department and the like, for example, corresponding character strings are previously registered. If a character string matches a previously registered character string, the character string is replaced with a dynamic variable corresponding to the registered character string. For example, a character string corresponding to a registered mail address is contained in a specific portion of a detailed setting, the character string is replaced with a dynamic variable indicating a mail address.

A dynamic variable is replaced with a corresponding value during execution. For example, the date variable is replaced with a date of execution, the mail address variable is replaced with a mail address of a login user, and the project name variable is replaced with a name of a project to which a login user belongs. Thus, the term "similar" can also mean that character strings of detailed settings have the same portion other than portions that can be replaced with dynamic variables corresponding to a time and a user.

Next, in step S505, recommended functions/settings generated in step S504 are summarized in a recommended button information table 1502, in which the function and detailed setting of job history information are added. An example thereof is shown in the table 1502 shown in a lower portion of FIG. 15.

When this step is ended, control returns to step S500, and the process of step S500 is repeated with respect to the next function group. In an MFP or an SFP, user interfaces corresponding to the recommended button information table 1502 are displayed (see FIG. 22). If any of the user interfaces is selected, a job is executed according to a function and a detailed setting corresponding to the selected button.

According to the first embodiment, it is possible to generate a recommended function/setting suitable for a login user and a recommended function/setting suitable for the contents of an original.

Thus, by retrieving a history of a job that has been executed by a user having similar user information, users having similar user information can execute similar jobs. Also, by detecting a tendency of an original from a word appearance frequency and retrieving a history of a job in which an original similar to that which was scanned by a login user has been processed, a similar result can be obtained for a similar original.

When a job is executed, a new history ID is assigned to the job and is added to a job history. Items as shown in FIG. 11 are specified and written.

Figure 24:
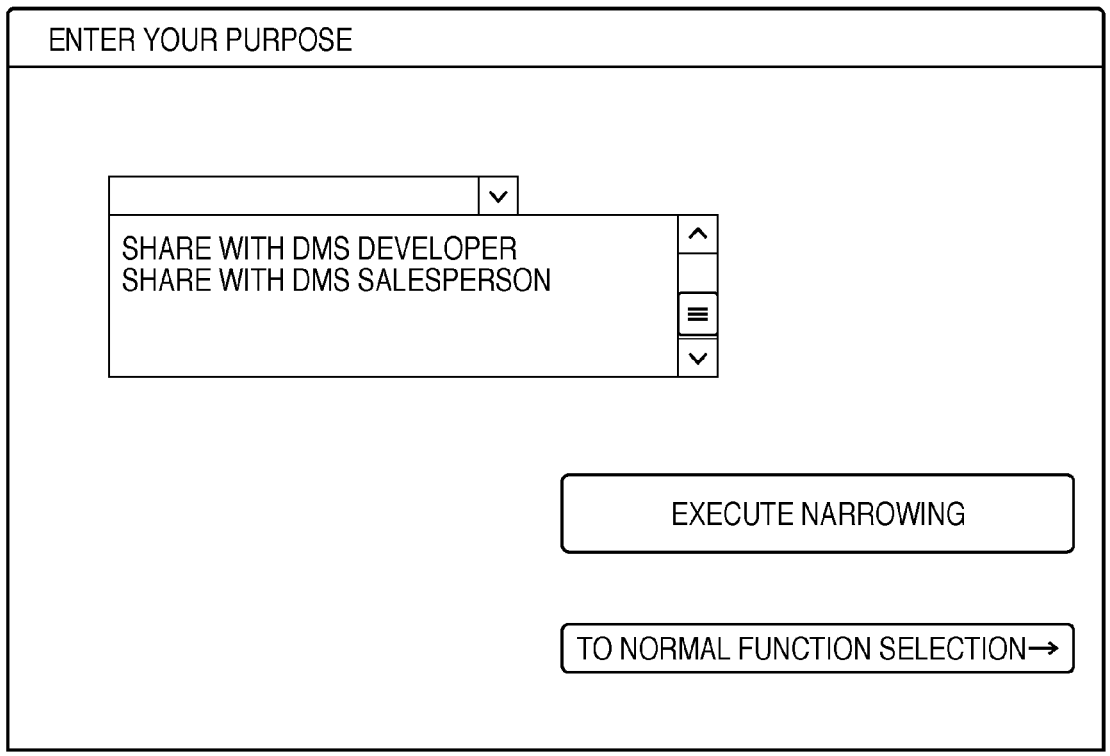
FIG. 24 is a diagram showing an exemplary user interface when narrowing is performed, depending on a purpose.

Note that, in the history narrowing process of FIG. 8, narrowing can be performed using an item "purpose" contained in a job history. In this case, for example, as shown in FIG. 24, character strings described in the purposes of job histories to be narrowed are displayed so that a user can select some of them. When there is a plurality of job histories having the same character string of the purpose, only one of them is displayed. Job histories related to the character string of the selected purpose remain as candidates. In this procedure, for example, in S402 of FIG. 8, once narrowing is ended, a user is caused to decide whether to perform further narrowing. If the user decides to perform further narrowing, narrowing is performed in terms of purpose by the aforementioned procedure. Note that the purpose is input by a user during execution of a job, and when a job history is used again, the same purpose is automatically set.

Second Embodiment

A second embodiment of the present invention will be described with reference to FIGS. 1 to 16 and further FIGS. 17 to 21. The second embodiment is different from the system of the first embodiment in that a recommended function/setting can be generated so that a job history that cannot be executed by only a multifunction device to which a user logs in can be executed in coordination with another multifunction device within the network.

[Recommended Function/Setting Generating Process]

Figure 17:
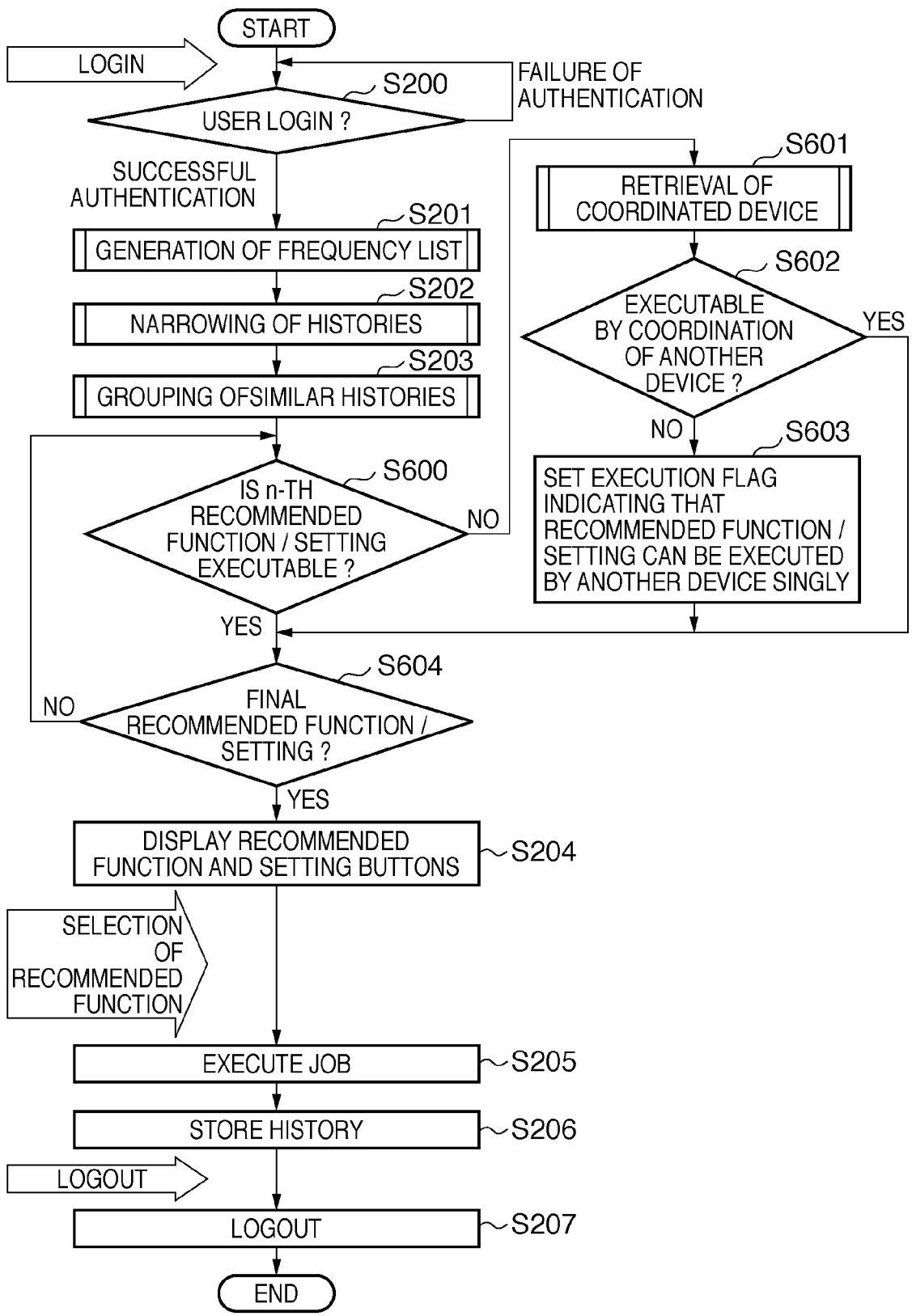
FIG. 17 is a basic flowchart showing a login process, a history narrowing process, and a similar history grouping process in an MFP according to a second embodiment of the present invention.

FIG. 17 is a basic flowchart showing a flow of a recommended function/setting generating process in this system. This flowchart is executed by a multifunction device (MFP) or a single-function device (SFP). Hereinafter, the recommended function/setting generating process will be described with reference to FIG. 17. Note that a process of changing information about a recommended function/setting that cannot be executed by only a multifunction device to which a user logs in, before displaying the recommended function/setting information as a button, will be described.

Steps S200 to S203 have been described in the first embodiment and will not be described.

In step S600, it is determined whether or not a function/setting indicated by a recommended function/setting can be executed by a multifunction device to which a user logs in, i.e., that is executing this process, successively from the leading function/setting in the recommended function/setting list generated in step S203. When a function/setting can be executed, either or both of a function and a setting of interest can be executed. If a function/setting can be executed, control goes to step S604. If a function/setting cannot be executed, control goes to step S601.

Figure 20B:
FIG. 20B is a diagram showing exemplary device information according to the second embodiment of the present invention.
Figure 20C:
FIG. 20C is a diagram showing exemplary device information according to the second embodiment of the present invention.

Note that, in step S600, the determination is performed with reference to device information as shown in FIGS. 20A to 20C. This device information may be held by each multifunction device or single-function device. Alternatively, the management of the device information may be centralized by a server or the like that the devices can access. For example, device information 2001 of FIG. 20A indicates functions that can be executed by a multifunction device having a device ID "001" and single-function devices included in the multifunction device. As shown in FIG. 20A, the device 001 can execute Print, Scan, ScanToBox, BoxToScan, Fax, RemotePrint, RemoteScan and RemoteBox functions. Also, according to device information 2002 of a device 002, the device 002 can execute only the Scan function.

In step S600, it is determined whether or not a function indicated by recommended function/setting information of interest is registered in the device information of the device. If the function is not registered, the function is determined as not being executable in step S600. If the function is registered, the function is determined as being executable in step S600.

In step S601, it is determined whether or not the function/setting indicated by the recommended function/setting can be executed in coordination with another multifunction device within the network. In this case, another multifunction device that can be coordinated is retrieved. This step will be described with reference to FIG. 18.

Next, in step S602, when, as a result of step S601, there is no retrieved multifunction device that can be coordinated, control goes to step S603. When a multifunction device that can be coordinated is retrieved and a recommended function/setting that is to be performed in coordination with another device can be generated, control goes to step S604.

A recommended function/setting for which no multifunction device that can be coordinated is retrieved in step S601, is determined as being able to be executed by a single multifunction device that is registered in the job history. Therefore, in step S603, for a recommended function/setting information of interest in the recommended function/setting list, an external device execution flag is set to indicate that the recommended function/setting can be executed by the multifunction device singly. This flag is, for example, set as an item in the recommended function/setting list. Note that the recommended function/setting for which no multifunction device that can be coordinated is retrieved, refers to a recommended function/setting that cannot be executed by coordination of a multifunction device to which a user logs in and a multifunction device within the network.

Next, in step S604, it is determined whether or not all of the recommended function/setting list has been processed. If the result of determination is positive, control goes to step S204. If there remains, in the list, recommended function/setting information that has not yet been processed, the recommended function/setting information is focused on and considered as new n-th recommended function/setting information, and control returns to step S600.

In step S204, a button registered in a recommended function/setting button list is displayed. In this case, for a button corresponding to recommended function/setting information whose external device execution flag step has been set in S603, an icon or the like is given so as to allow a user to visually understand that the recommended function/setting can be executed only in another multifunction device within the network.

Step S205 and thereafter have been described in the first embodiment and will not be described.

[Substitute Multifunction Device Retrieving and Determining Process]

Figure 18:
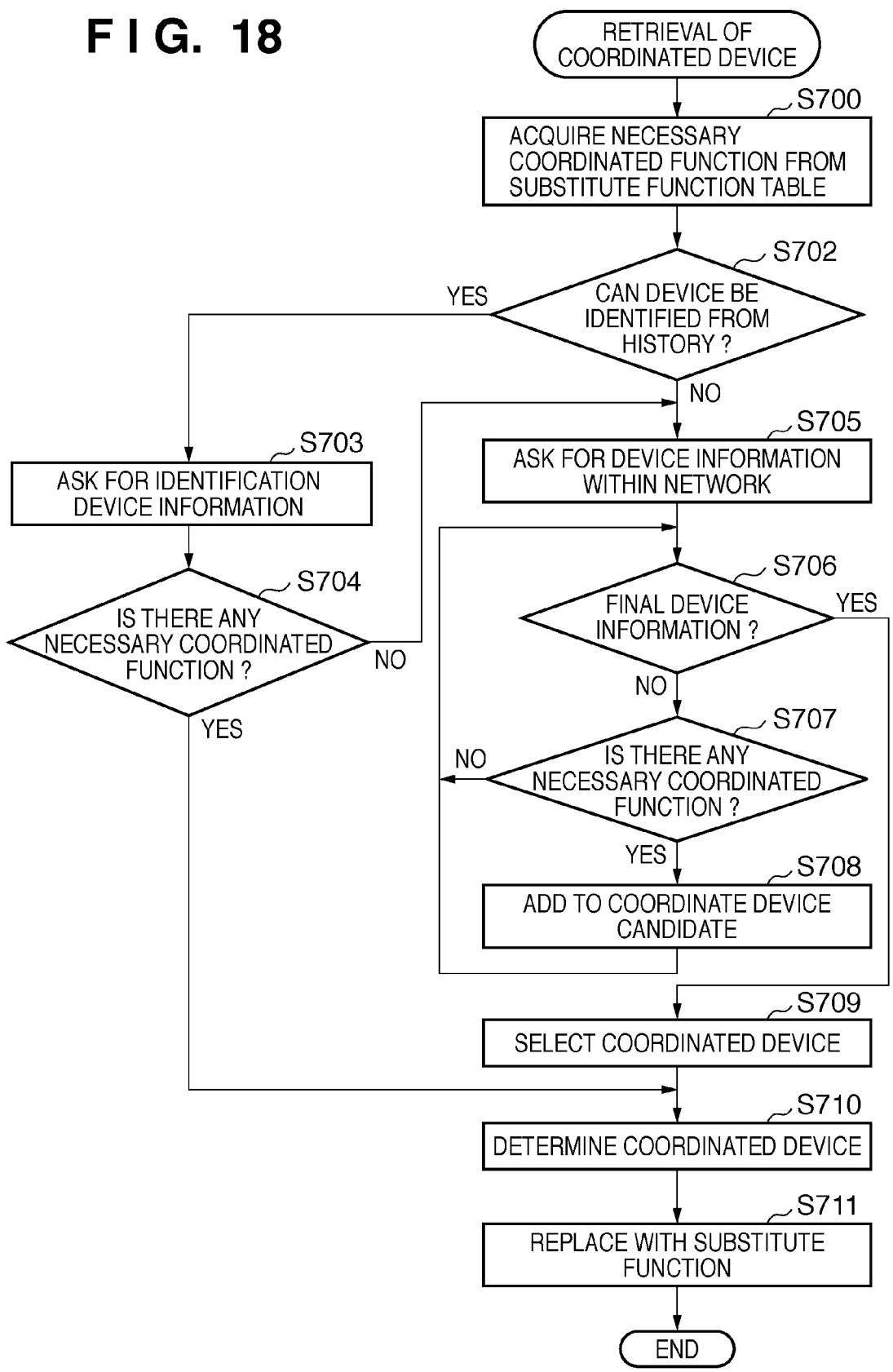
FIG. 18 is a flowchart showing a coordinated MFP determining process in the MFP of the second embodiment of the present invention.

FIG. 18 is a flowchart showing a process of retrieving a function of a multifunction device within the network and determining whether or not a recommended function/setting is executable. FIG. 18 shows details of step S601 of FIG. 17. Hereinafter, the process will be described in detail with reference to FIG. 18.

In step S700, a coordinated function is retrieved that is required to serve as a substitute to execute a function/setting indicated by the recommended function/setting information obtained in step S600. In this example, as shown in FIG. 19, the coordinated function is retrieved from the coordinated function table 1901 in which coordinated functions are registered. FIG. 19 is only for illustrative purposes. A registered function needs to be a coordinated function that is a combination of a function in a "From" column and a function in a "To" column. A function having a function name containing "remote" is a function (coordinated function) that is performed by another device as a substitute. For example, in a multifunction device (device) having the substitute table 1901, the Copy function is a coordinated function. The substitute table 1901 indicates that the Copy function is divided into scanning and printing, and the multifunction device performs scanning and another device (substitute) performs printing (remote printing) of the scanned image data. The ScanToBox function of storing scanned image data as a file is also a coordinated function. The ScanToBox function is divided into scanning and storage, where the multifunction device performs scanning and another device (substitute) stores the scanned image data (remote box function). The BoxToPrint function of printing image data stored as a file is also a coordinated function. The BoxToPrint function is divided into storage and printing, where another device (substitute) stores image data (remote box function) and another device (substitute) prints the image data (remote print function). Therefore, in the multifunction device having the coordinated function table 1901, for example, if a recommended function of interest is "copy", the recommended function of interest is registered in the coordinated function table 1901 and is therefore determined as a coordinated function. In addition, it is determined according to the table that the recommended function of interest is performed as scanning that is a function of the multifunction device and remote printing that is a coordinated function of another device. Thus, a recommended function that is to be executed as a coordinated function is specified.

Next, in step S702, it is determined whether or not a multifunction device that can execute the specified coordinated function can be identified from a job history. Since the device ID of a multifunction device or the like that has executed a job is registered in the job history, a coordinated function (particularly, a function matching a coordinated function that is remotely executed) is retrieved from the job history. The process of step S702 removes the necessity of obtaining device information from all multifunction devices within the network for each time. Therefore, a delay in process can be prevented. If the result of determination is positive, control goes to step S703. If the result of determination is negative, control goes to step S705.

Next, in step S703, device information indicating a device function or the like is acquired from the multifunction device that has been identified in step S702 and can perform the coordinated function. This example is shown in FIGS. 20A to 20C. This has been described above.

Next, in step S704, based on the device information of the device of interest, it is determined whether or not the coordinated function (particularly, a remotely executed function) specified in step S700 can be used in the device of interest. The device information contains a static or unchangeable function, or a function that dynamically becomes effective or ineffective. Therefore, it is desirable to determine whether or not the coordinated function can be executed, based on the latest device information. If the device of interest cannot execute the coordinated function, control goes to step S705, in which another multifunction device (device) is retrieved. On the other hand, when a function is required, control goes to S710, in which a multifunction device that will coordinate is determined.

In step S705, device information is requested to all multifunction devices within the network, and is acquired from each multifunction device.

In step S706, retrieval is performed, successively focusing on each device of the device information acquired in step S705. After retrieval is executed for the final device information, control goes to step S709.

In step S707, it is determined whether or not a coordinated function required to serve as a substitute to execute a function/setting indicated by recommended function/setting information exists in the device information of interest. If the result of determination is positive, control goes to step S708. If the result of determination is negative, control returns to step S706, in which the next device is focused on, and the process is executed with respect to the device information.

In step S708, the device of interest (e.g., the device ID) is added as a candidate for a multifunction device that can be coordinated (coordinated multifunction device) to the list. Control returns to step S706, in which the next device information is focused on and is subjected to the retrieval process.

Next, if retrieval of a candidate for a coordinated multifunction device has been performed for all devices, one coordinated multifunction device is selected from the candidates in step S709. As a method for the selection, the candidates may be displayed via the operation unit controller 205 and may be selected according to user's choice (FIG. 23). A candidate may be automatically selected. In this case, for example, if device information contains information about performance, a device having the highest performance may be selected, for example.

In step S710, the multifunction device selected in step S709 is determined as a coordinated multifunction device.

Figure 21:
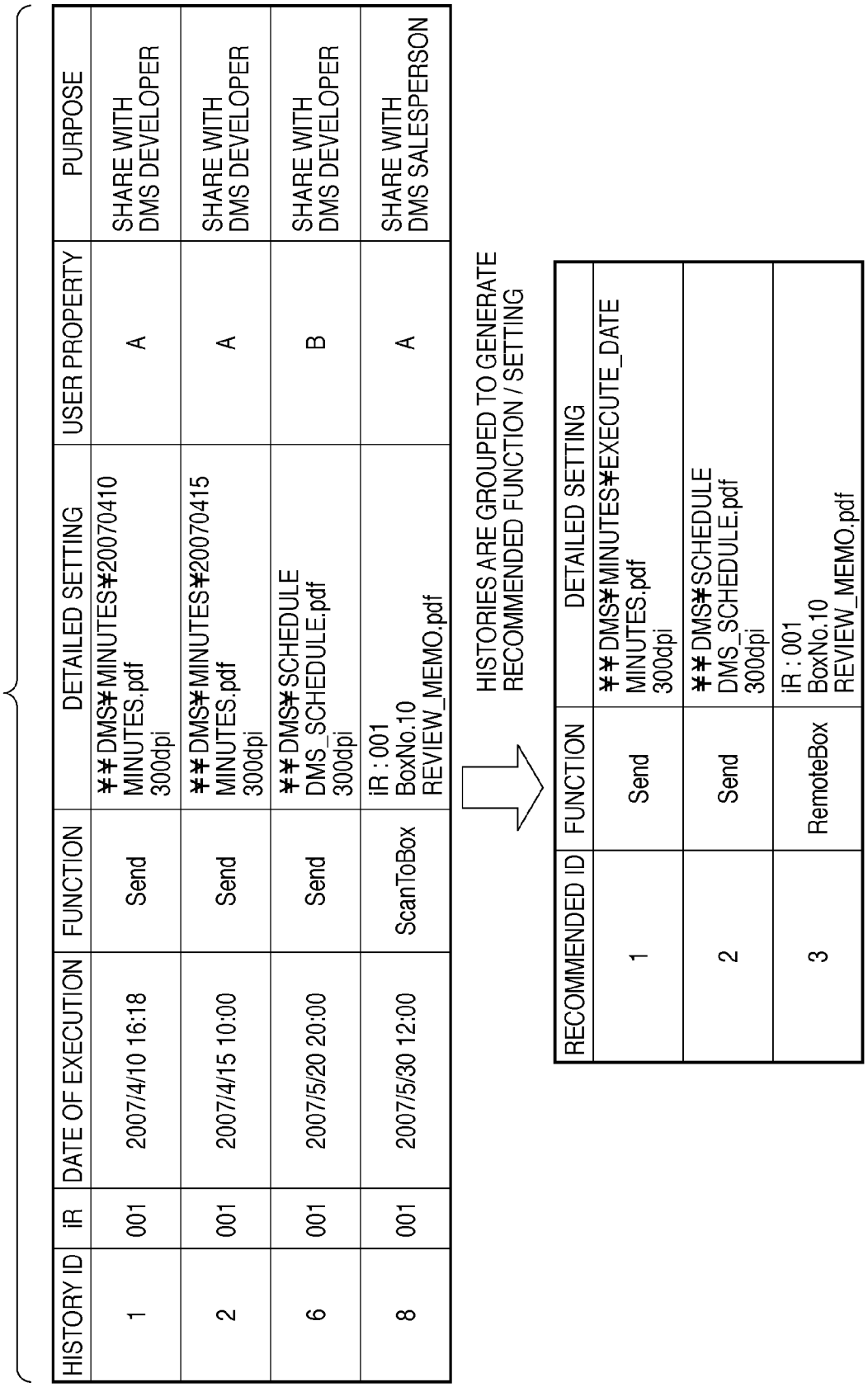
FIG. 21 is a diagram showing exemplary recommended function/setting information according to the second embodiment of the present invention.

Next, in step S711, the recommended function/setting information indicated in step S600 is replaced with the coordinated function acquired in step S700, and this process is ended. For example, as shown in FIG. 21, it is assumed that no external storage device exists with respect to a multifunction device to which a user logs in, and as shown in FIG. 19, the ScanToBox function is achieved as a coordinated function of the Scan function and the RemoteBox function. Since the ScanToBox function contained in the job history of ID 8 of FIG. 19 cannot be executed by the multifunction device, the "ScanToBox" function is replaced with the coordinated function "RemoteBox". The thus-obtained recommended function/setting information is displayed as a button.

According to the second embodiment, by retrieving a history of a job that has been executed by a user having similar user information, users having similar user information can execute similar jobs. Also, by detecting a tendency of the contents of an original based on a word appearance frequency, and retrieving a job history of execution of an original similar to an original that has been scanned by a login user, a similar result can be obtained with respect to a similar original.

In addition, by displaying that a recommended function/setting button that is not executable can be executed by another multifunction device within a network, the other multifunction device within the network can be recommended.

Note that the present invention may be applied to a system including a plurality of devices (e.g., a host computer, an interface device, a reader, a printer, etc.) or an apparatus including a single device (e.g., a copier, a fax machine, etc.). The object of the present invention is achieved by supplying a recording medium recording a program code for achieving the function of the embodiment above to a system or a device, and allowing a computer included in the system or device to read and execute the program code stored in the recording medium. In this case, the program code itself read out from the storage medium achieves the function of the embodiment above, and the program code itself and the storage medium storing the program code are included in the present invention.

The present invention also encompasses a case where the whole or a part of an actual process is performed by an operating system (OS) running on a computer in accordance with an instruction of the program code, and the function of the embodiment above is achieved by the process. Moreover, the present invention is also applicable to a case where the program code read out from the storage medium is written into a function extension card inserted into a computer or a memory included in a function extension unit connected to a computer. In this case, the whole or a part of an actual process is performed by a CPU included in the function extension card or the function extension unit in accordance with the written program code, and the function of the embodiment above is achieved by the process.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-100866, filed Apr. 8, 2008, which is hereby incorporated by reference herein in its entirety.

What is claimed is:

1. An output device connected to an information storage storing job history information containing a record having a user ID for identifying an owner of an executed job, property information of document information processed by the job, and a history containing function information indicating a function used in the job, the output device comprising:
   an acquisition unit, configured to acquire property information about a login user;
   an extractor, configured to extract, from document information to be processed, property information indicating a property of the document information;
   an identification unit, configured to identify, from the record of the job history information stored in the information storage, a candidate record having property information about a user matching at least a part of the property information of the login user obtained by the acquisition unit, and history information containing property information of document information matching at least a part of the property information of the document information to be processed that has been extracted by the extractor;
   a display controller, configured to provide display for designating one of the candidates so as to utilize a function indicated by function information contained in the candidate record; and
   an executor, configured to execute a job using the function indicated by the function information contained in the candidate record with respect to the document information to be processed, based on the candidate record designated based on the display of the display controller.

2. The output device according to claim 1, further comprising:
   a detector, configured to detect an item to be changed, depending on property information about a login user when executing a job, or a time, from a setting of the function indicated by the function information contained in the candidate record,
   wherein the executor is configured to set information based on the property information about the login user acquired by the acquisition unit or a current time, to the item detected by the detector, and execute a job.

3. The output device according to claim 2, wherein
   the display controller is configured to display a record containing function information having a matching item other than the item detected by the detector.

4. The output device according to claim 1, wherein
   the extractor is configured to extract, as the property information, information in which a word used in the document to be processed and an appearance frequency of the word are related to each other.

5. The output device according to claim 1, wherein
   the property information of the user contains at least any of an ID, a post, a business in charge, and a mail address of the user.

6. The output device according to claim 1, further comprising:
   a second identification unit, configured to identify a record containing a history of a job executing a function that cannot be executed by a device, from the candidate record,
   wherein, when the record designated based on the display by the display controller is the same as the record identified by the second identification unit, a coordination of the device and another device connected thereto via a communication line is configured to achieve a function indicated by the function information contained in the record.

7. An output method using an output device connected to an information storage storing job history information containing a record having a user ID for identifying an owner of an executed job, property information of document information processed by the job, and a history containing function information indicating a function used in the job, the output method comprising:
   an acquisition step of acquiring property information about a login user;
   an extraction step of extracting, from document information to be processed, property information indicating a property of the document information;
   an identification step of identifying, from the record of the job history information stored in the information storage, a candidate record having property information about a user matching at least a part of the property information of the login user obtained by the acquisition step, and history information containing property information of document information matching at least a part of the property information of the document information to be processed that has been extracted by the extraction step;

a display control step of providing display for designating one of the records identified in the identification step so as to utilize a function indicated by function information contained in the candidate record; and an execution step of executing a job using the function indicated by the function information contained in the record with respect to the document information to be processed, based on the record designated based on the display of the display control step.

8. The output method according to claim 7, further comprising:

a detection step of detecting an item to be changed, depending on property information about a login user when executing a job, or a time, from a setting of the function indicated by the function information contained in the candidate record, wherein the execution step includes setting information based on the property information about the login user acquired by the acquisition step or a current time, to the item detected by the detection step, and executing a job.

9. The output method according to claim 8, wherein the display control step includes displaying a record containing function information having a matching item other than the item detected by the detection step.

10. The output method according to claim 7, wherein the extraction step includes extracting, as the property information, information in which a word used in the document to be processed and an appearance frequency of the word are related to each other.

11. The output method according to claim 7, wherein the property information of the user contains at least any of an ID, a post, a business in charge, and a mail address of the user.

12. The output method according to claim 7, further comprising:

a second identification step of identifying a record containing a history of a job executing a function that cannot be executed by a device, from the candidate record, wherein, when the record designated based on the display by the display control step is the same as the record identified by the second identification step, a function indicated by the function information contained in the record is achieved by coordination of the device and another device connected thereto via a communication line.

13. A non-transitory computer-readable storage medium storing a program for executing an output method using a computer that can access an information storage storing job history information containing a record having a user ID for identifying an owner of an executed job, property information of document information processed by the job, and a history containing function information indicating a function used in the job, the output method comprising:

an acquisition step of acquiring property information about a login user;

an extraction step of extracting, from document information to be processed, property information indicating a property of the document information;

an identification step of identifying, from the record of the job history information stored in the information storage, a candidate record having property information about a user matching at least a part of the property information of the login user obtained by the acquisition step, and history information containing property information of document information matching at least a part of the property information of the document information to be processed that has been extracted by the extraction step;

a display control step of providing display for designating one of the records identified in the identification step so as to utilize a function indicated by function information contained in the candidate record; and an execution step of executing a job using the function indicated by the function information contained in the record with respect to the document information to be processed, based on the record designated based on the display of the display control step.

* * * * *